(12) United States Patent
Kim et al.

(10) Patent No.: US 11,916,998 B2
(45) Date of Patent: Feb. 27, 2024

(54) MULTI-CLOUD EDGE SYSTEM

(71) Applicant: Electronics and Telecommunications Research Institute, Daejeon (KR)

(72) Inventors: Dae-Won Kim, Daejeon (KR); Su-Min Jang, Daejeon (KR); Jae-Geun Cha, Daejeon (KR); Hyun-Hwa Choi, Daejeon (KR); Sun-Wook Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/985,381

(22) Filed: Nov. 11, 2022

(65) Prior Publication Data

US 2023/0156074 A1  May 18, 2023

(30) Foreign Application Priority Data

Nov. 12, 2021 (KR) .................... 10-2021-0156007
Sep. 21, 2022 (KR) .................... 10-2022-0119177

(51) Int. Cl.
*H04L 67/10* (2022.01)
*H04L 12/46* (2006.01)

(52) U.S. Cl.
CPC .......... *H04L 67/10* (2013.01); *H04L 12/4633* (2013.01)

(58) Field of Classification Search
None
See application file for complete search history.

(56) References Cited

U.S. PATENT DOCUMENTS

| | | | |
|---|---|---|---|
| 9,697,376 B2 | 7/2017 | Madanapalli et al. | |
| 10,719,517 B1 | 7/2020 | Li et al. | |
| 10,783,121 B2 | 9/2020 | Brand | |
| 10,846,137 B2 | 11/2020 | Vallala et al. | |
| 10,938,736 B2 | 3/2021 | Guo et al. | |
| 11,109,202 B2 | 8/2021 | Yang et al. | |
| 11,194,566 B1* | 12/2021 | Gabrielson | G06F 8/65 |
| 11,573,816 B1* | 2/2023 | Featonby | H04L 67/10 |
| 2002/0035669 A1 | 3/2002 | Baek et al. | |
| 2018/0322437 A1* | 11/2018 | McClory | G06F 8/30 |
| 2019/0138638 A1* | 5/2019 | Pal | G06F 16/285 |
| 2019/0138934 A1* | 5/2019 | Prakash | G06F 9/5072 |
| 2019/0173840 A1* | 6/2019 | Desai | H04L 67/56 |
| 2019/0327506 A1* | 10/2019 | Zou | H04N 21/2405 |
| 2020/0192690 A1* | 6/2020 | Gupta | H04L 67/34 |
| 2020/0296155 A1* | 9/2020 | McGrath | G06F 9/5027 |
| 2020/0382445 A1* | 12/2020 | Calmon | H04L 47/827 |
| 2021/0141836 A1 | 5/2021 | Byrne | |
| 2021/0149737 A1 | 5/2021 | An et al. | |

(Continued)

FOREIGN PATENT DOCUMENTS

| | | |
|---|---|---|
| KR | 1020180068004 A | 6/2018 |
| KR | 1020180119905 A | 11/2018 |

(Continued)

*Primary Examiner* — Phyllis A Book
(74) *Attorney, Agent, or Firm* — William Park & Associates Ltd.

(57) ABSTRACT

Disclosed herein is a multi-cloud edge system. The multi-cloud edge system includes a core cloud, a multi-cluster-based first edge node system, and a multi-cluster-based near edge node system, wherein the multi-cluster-based first edge node system includes multiple worker nodes, and a master node including a scheduler.

6 Claims, 20 Drawing Sheets

(56) References Cited

U.S. PATENT DOCUMENTS

| | | |
|---|---|---|
| 2022/0038554 A1* | 2/2022 | Merwaday .............. H04L 67/63 |
| 2022/0078231 A1 | 3/2022 | An et al. |
| 2023/0086899 A1* | 3/2023 | Sharma Banjade .. H04W 16/14 |
| | | 455/515 |
| 2023/0177349 A1* | 6/2023 | Balakrishnan ........... G06N 3/08 |
| | | 706/25 |

FOREIGN PATENT DOCUMENTS

| | | |
|---|---|---|
| KR | 1020200080458 A | 7/2020 |
| KR | 102260549 B1 | 6/2021 |
| WO | WO-2020161561 A1 * | 8/2020 |

* cited by examiner

MULTI-CLOUD EDGE SYSTEM

CROSS REFERENCE TO RELATED APPLICATIONS

This application claims the benefit of Korean Patent Application Nos. 10-2021-0156007, filed Nov. 12, 2021 and 10-2022-0119177, filed Sep. 21, 2022, in the Korean Intellectual Property Office, which are hereby incorporated by reference in their entireties into this application.

BACKGROUND OF THE INVENTION

1. Technical Field

The present invention relates generally to a multi-cloud edge system, and more particularly to technology for configuring and managing multiple clusters so as to provide service for edge computing.

2. Description of the Related Art

Edge computing technology requires some of enterprise data centers or centralized cloud services, and distributes, as some of various distributed computing topologies including the same, computing storage software or the like from a core to an edge. Also, in order to provide a service faster than existing cloud terminal-centered centralized cloud infrastructure, a response speed and security of safety-critical service may be guaranteed by providing a core cloud-cloud edge-terminal collaboration-based low delay data processing technology which selectively utilizes computing resources closer to a service user.

Recently, in order to solve processing caused by central cloud concentration of rapidly increased data generated by large-scale terminals desired by a user and overcome a transmission delay, technology for providing an intelligent cloud edge service which processes data at a location closer to a terminal has been developed, and related service systems have been released. Among the related service systems, Kubernetes operated as a single cluster is a tool that is designed to orchestrate and integrally operate an Open Container Initiative (OCI)-based container environment and is the most widely used tool at the present time. However, Kubernetes is limited in the purpose of a single cluster environment, and requires a tool for associating multiple clusters with each other. For example, Rancher was devised to install and establish multiple Kubernetes clusters so as to support Kubernetes configured using multiple clusters. Also, Rancher was devised and designed to allow a user to easily support all resources from a public cloud to a bare-metal server.

Further, in order to provide service by associating cloud edges and core clouds that are distributed, research into various methods has been conducted. For this, as L7-layer-based service mesh technology, OpenShift (Istio) in an open source camp has been actively conducted. A service mesh is a program developed for association between micro-services. This method allows a control plane to be shared on multiple networks and allows clusters to communicate with each other through a gateway, and thus there is no need to directly connect two networks to each other.

Cloud computing is characterized that data is processed by a data center, but edge computing requires a high-performance platform that processes data at a location closer to a terminal and performs distributed collaboration between cloud-edge-terminals is required in order to perform processing attributable to cloud centralization of a large amount of data generated by large-scale edge terminals and overcome a transmission delay.

However, the existing edge system has problems such as insufficiency of a management method considering multiple clusters, provision of services in a form unoptimized for bare-metal, a container, a FaaS service, etc., non-provision of a resource addition method for guaranteeing performance when available resources are insufficient, the requirement of a design at the level of an application for vertical/horizontal collaboration, insufficiency of a network architecture for connecting multiple clusters at high speed, a performance problem with OC used in Kubernetes (delay of service sensitive to a response speed), and absence of technology in architecture for complete collaborative solutions.

PRIOR ART DOCUMENTS

Patent Documents (Patent Document 1) Korean Patent Application Publication No. 10-2018-0119905, Date of Publication: Nov. 5, 2018 (Title: Application Execution System Based on Distributed Cloud, Apparatus and Control Method Thereof Using the System).

SUMMARY OF THE INVENTION

Accordingly, the present invention has been made keeping in mind the above problems occurring in the prior art, and an object of the present invention is to configure a tunneling-based high-speed network environment, which can associate multiple clusters with each other so that a distributed computing environment based on a container is supported in edge computing.

Another object of the present invention is to propose a new high-performance architecture so as to perform optimal management between clusters on a connected network and collaboration between services.

A further object of the present invention is to support an application developer to apply and embody edge platform-based distributed collaboration for connecting vertical collaboration between an edge and an edge terminal to horizontal collaboration between an edge and a cloud edge, at a system level, by providing a system structure and an intelligent scheduling method for optimizing vertical and horizontal collaboration between a cloud and an edge.

Yet another object of the present invention is to configure a high-performance container and a global cache for data association between containers by utilizing a memory-based storage device for improving efficiency of a container.

In accordance with an aspect of the present invention to accomplish the above objects, there is provided a multi-cloud edge system, including a core cloud, a multi-cluster-based first edge node system, and a multi-cluster-based near edge node system, wherein the multi-cluster-based first edge node system includes multiple worker nodes, and a master node including a scheduler.

The first edge node system and the near edge node system may be connected to each other over a high-speed network based on a tunneling protocol.

The multi-cloud edge system may further include a shared storage device for sharing and storing data depending on a collaborative operation between the first edge node system and the near edge node system.

The multi-cloud edge system may further include a management node for controlling a resource required for a collaborative operation based on data of the first edge node system and the near edge node system.

The first edge node system or the near edge node system may include computing nodes, and each of the computing nodes may provide a monolithic application, a micro-service, and a Function as a Service (FaaS) based on a container platform.

The first edge node system may receive a request for a computational load corresponding to a task from an external device, the master node may determine a worker node to which an application capable of performing the task is distributed using the scheduler, the determined worker node may perform the task, and the master node may respond to the external device by collecting results of performing the task.

A service based on computation in vertical collaboration, provided by the core cloud and the first edge node system, and a service based on computation in horizontal collaboration, provided by the first edge node system and the near edge node system, may be provided.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
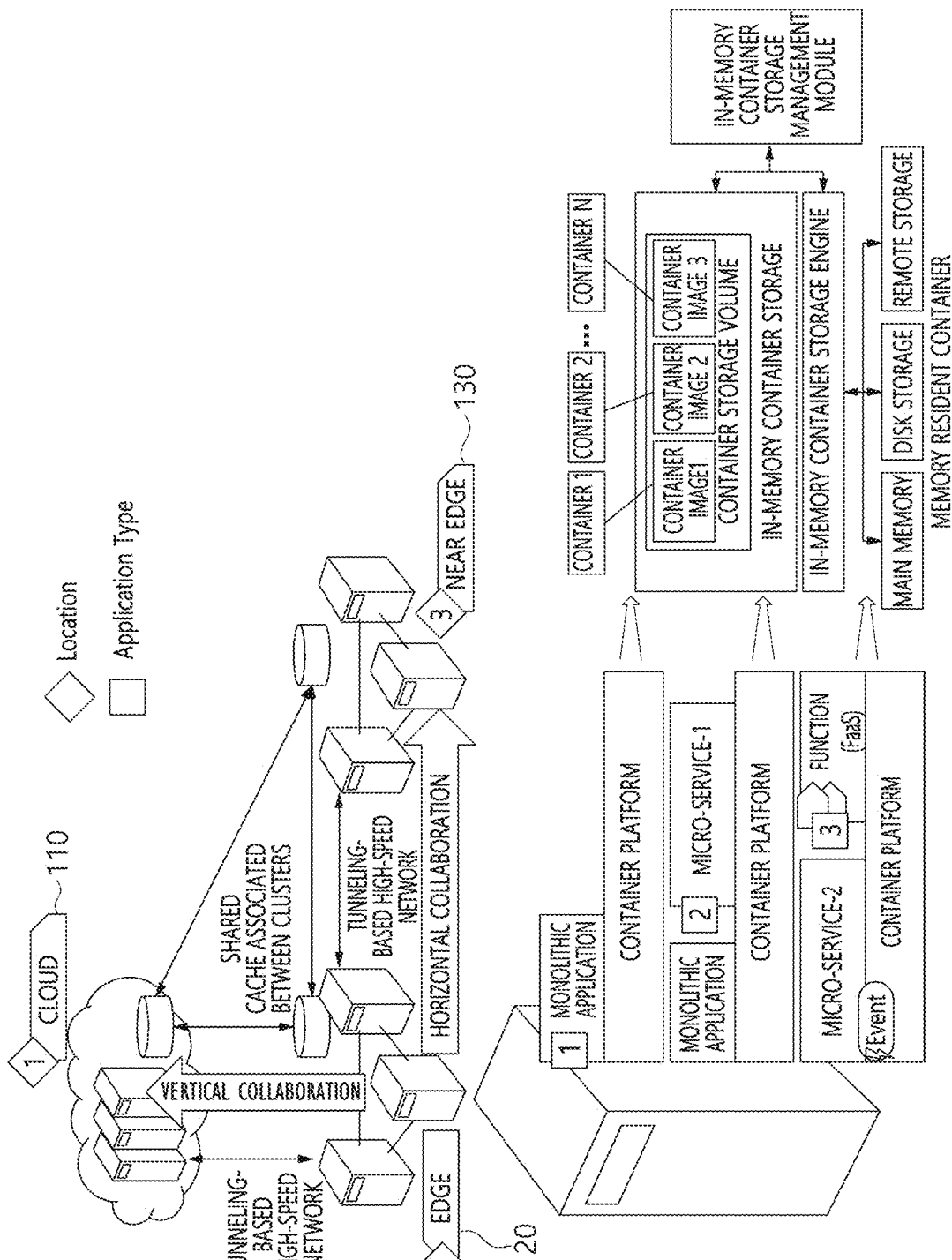
FIG. 1 is a diagram illustrating an example of the structure of a multi-cluster-associated architecture for an edge service according to the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Hereinafter, preferred embodiments of the present invention will be described in detail with reference to the attached drawings.

FIG. 1 is a diagram illustrating an example of the structure of a multi-cluster-associated architecture for an edge service according to the present invention.

Referring to FIG. 1, in the edge system according to the present invention, vertical collaboration refers to collaboration between a core cloud 110 and an edge 120, and horizontal collaboration refers to collaboration between the edge 120 and a near edge 130.

In this case, for each collaboration, network connection such as that shown in FIG. 1 is required. Therefore, in the present invention, a tunneling-based high speed network for collaboration may be configured, and a shared storage and a shared repository for associating mutual clusters may be configured. The edge system configured in this way may be driven and managed by a global scheduler which takes charge of the overall management.

Here, the nodes of each cluster may be container platforms, and may include a monolithic application, a microservice, a Function as a Service (FaaS), etc. As described above, each container platform may be configured based on a memory resident container using a memory-based storage device, and a global cache may also utilize a memory-based storage for high-speed configuration.

Figure 2:
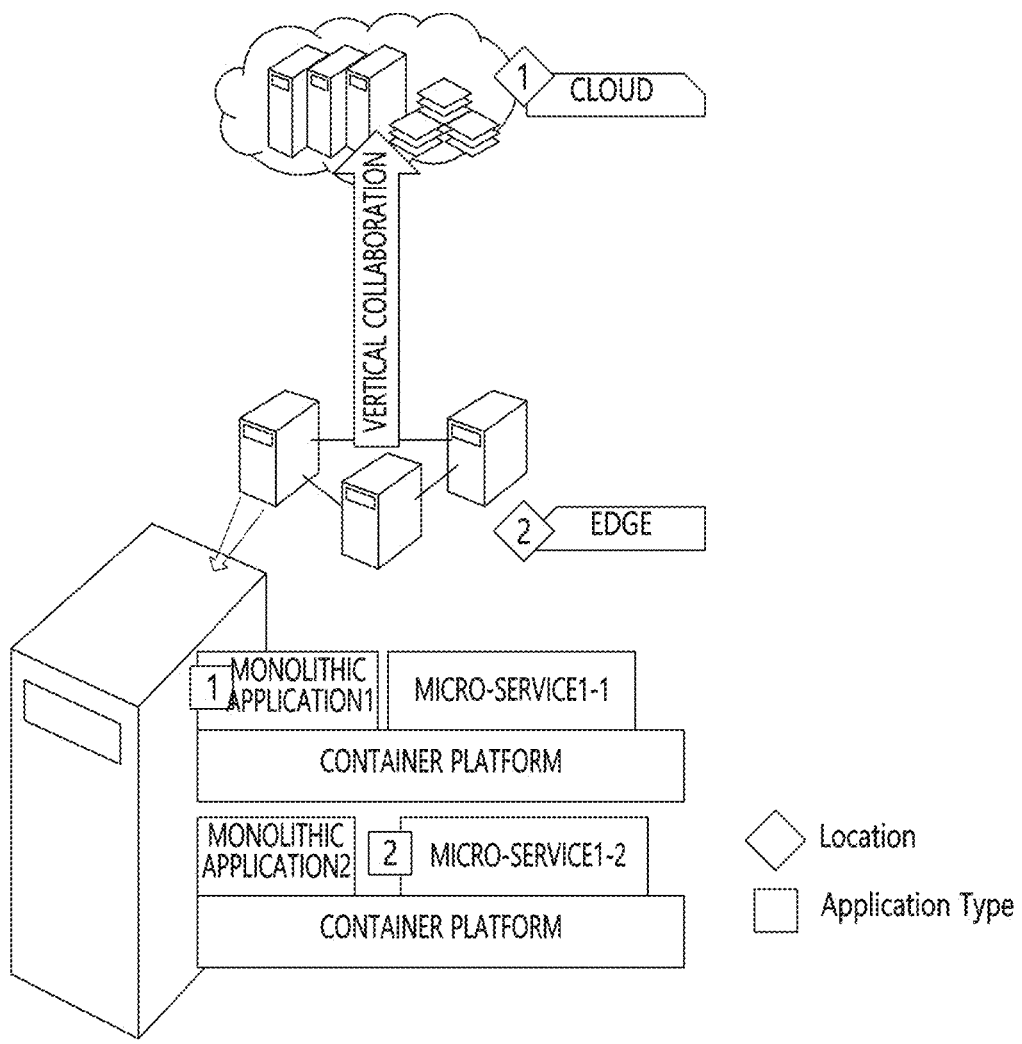
FIG. 2 is a diagram illustrating an example of a system for an existing edge service.
Figure 3:
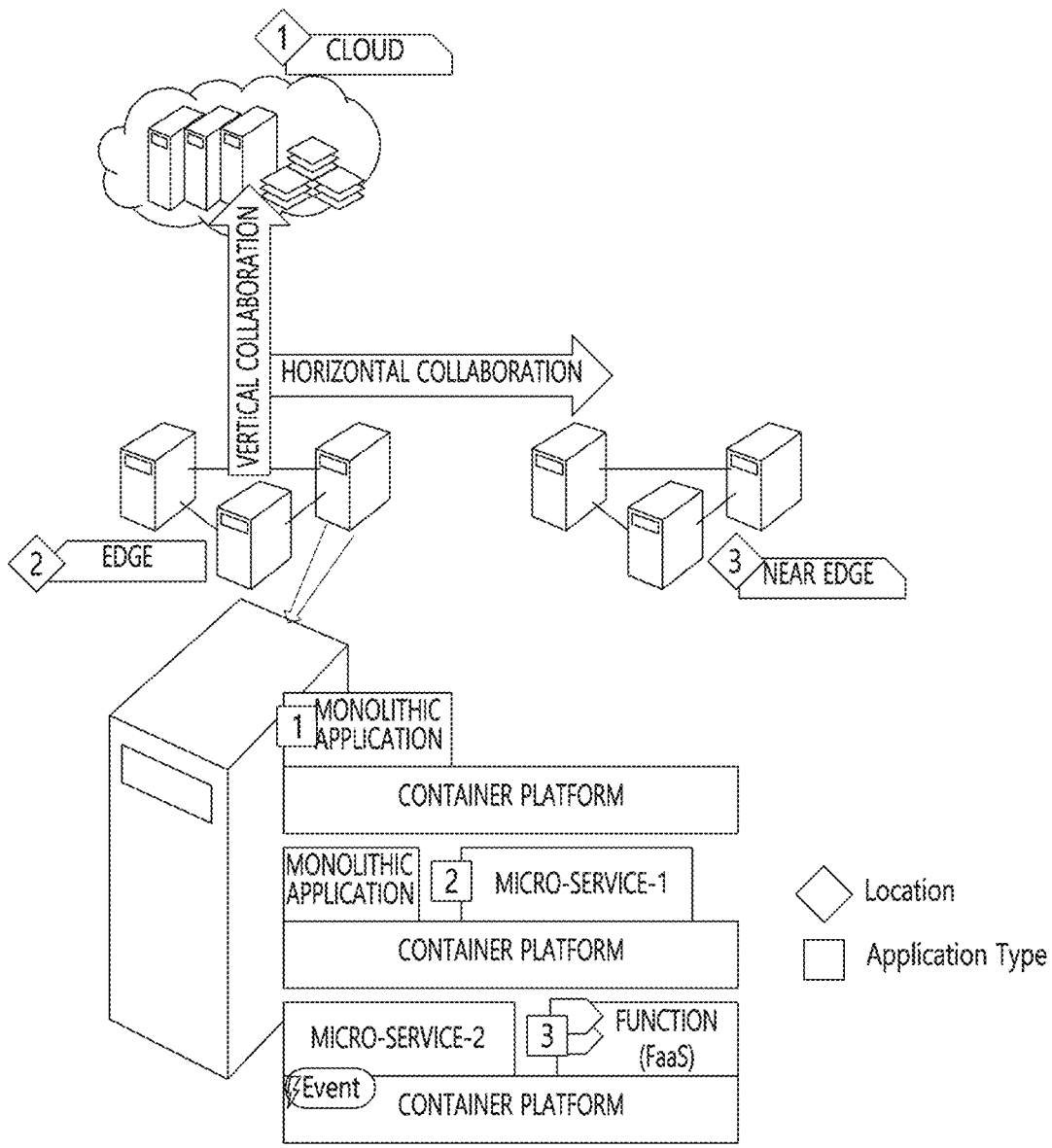
FIG. 3 is a diagram illustrating an example of an edge service system based on three locations including a cloud, an edge, and a near edge according to the present invention.

Here, the existing edge service has a form in which only vertical collaboration is supported, as shown in FIG. 2, and has the following problems:

Insufficient support of movement by a moving body
Partial vertical collaboration
Limited connection technology for collaboration
Partial support for service association That is, a system for the existing edge service such as that shown in FIG. 2 is configured using a relationship between two elements, that is, a cloud and an edge, but an edge service system proposed in the present invention may be configured using three locations in which a conceptual edge called 'near edge' is added to existing elements, that is, the cloud and the edge, as shown in FIG. 3.

In this case, the three locations may refer to a cloud (i.e., public/private cloud), an edge (i.e., an edge serviced with the edge directly connected to a user), and a near edge (i.e., a neighboring edge closer to the edge).

Furthermore, referring to FIG. 2, the existing edge service provides only a monolithic application and a micro-service, whereas the edge service system proposed in the present invention may support three application types corresponding to a monolithic application (App), a micro service, and a Function as a Service (FaaS), as illustrated in FIG. 3.

Here, the three application types may have different features from the standpoint of complexity of application, service scale, and resource usage form, as shown in Table 1.

TABLE 1

|  | Complexity | Scale | Resource usage form |
| --- | --- | --- | --- |
| Monolithic application | Simple | Middle | Always uses resources |
| Micro-service | Complicated | Large | Enables expansion/reduction of partial resource usage |
| FaaS | Simple | Small | Temporarily uses resources |

Therefore, the edge service proposed in the present invention needs to effectively apply a function such as mutual collaboration or service movement in which those features are desirably reflected.

Here, referring to FIG. 3, optimization of vertical and horizontal collaboration by the edge service system according to the present invention may be supported based on 3 Locations, 3 Application Types (3LT). That is, because the existing edge service such as that illustrated in FIG. 2 provides partial and vertical collaboration, there is a limitation in that service collaboration is restricted or service linkage is partial.

Therefore, in order to solve this problem, the present invention proposes a structure enabling various types of vertical and horizontal collaboration regardless of location or service type through the 3LT-based edge service system illustrated in FIG. 3.

Figure 4:
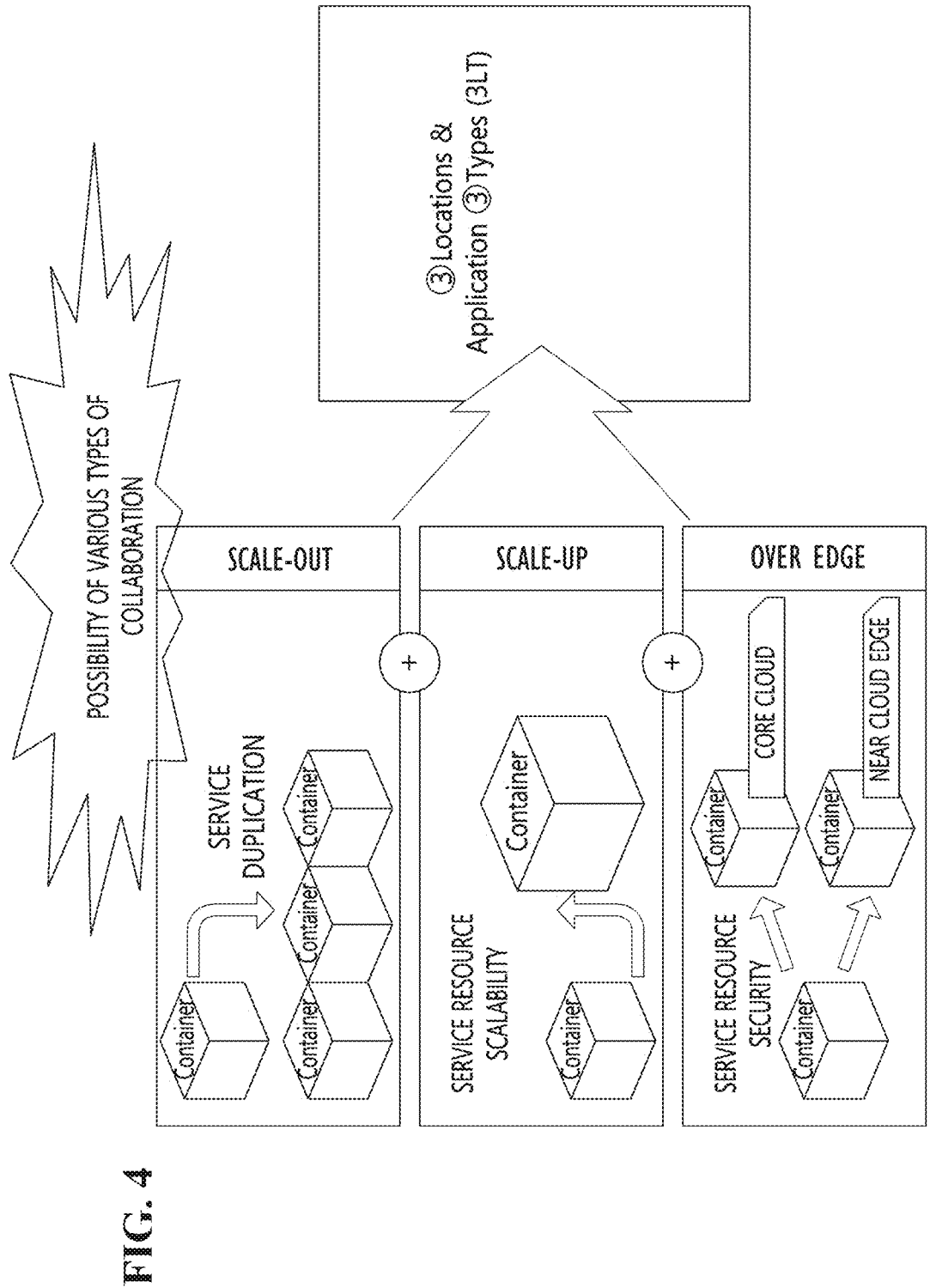
FIG. 4 is a diagram illustrating an example of an edge service enabling vertical and horizontal collaboration according to the present invention.

Here, FIG. 4 illustrates an example of an edge service enabling vertical and horizontal collaboration according to the present invention, wherein principal collaboration between a cloud and an edge system may be supported in conformity with the form of scale-out using 3 L, scale-up using 3 L, predictive over-edge using 3 L, etc.

Figure 5:
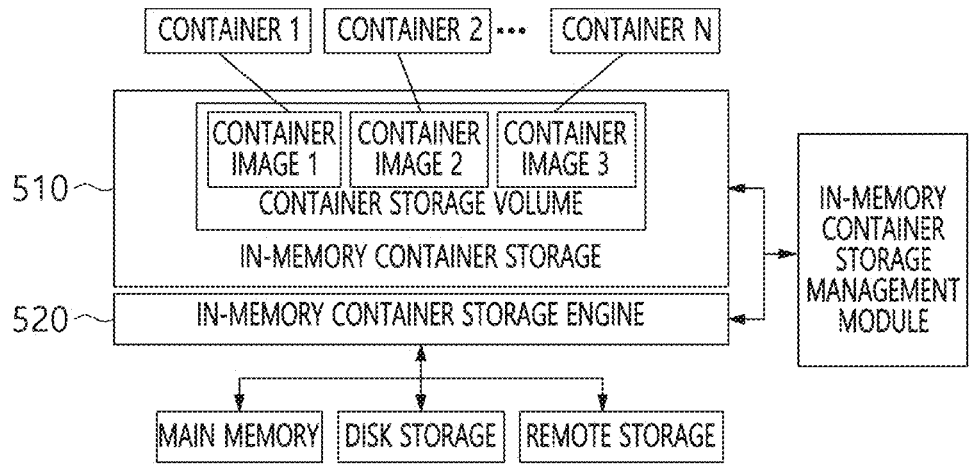
FIG. 5 is a diagram illustrating an example of the structure of an in-memory container storage-based container system according to the present invention.

FIG. 5 is a diagram illustrating an example of the structure of an in-memory container storage-based container system according to the present invention.

Referring to FIG. 5, an in-memory container storage system according to the present invention may include in-memory container storage 510, in-memory container storage engine 520, main memory, disk storage, and remote storage.

Figure 6:
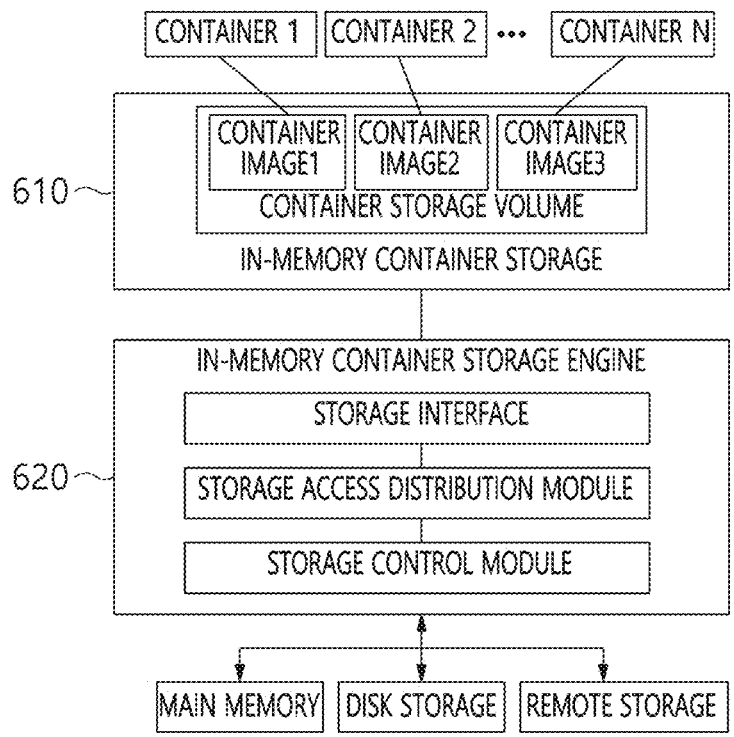
FIG. 6 is a diagram illustrating an example of the detailed structure of the in-memory container storage illustrated in FIG. 5.

Hereinafter, the structure and operation flow of the in-memory container storage system according to the present invention will be described in detail with reference to FIG. 6.

First, a container may generate an in-memory container storage 610, which is storage in main memory having nonvolatile characteristics, and may configure a storage volume for the container in the in-memory container storage 610.

The container may generate and operate a container storage volume, which is the volume of a file system (example of a docker is /var/lib/docker) in which the container is executed, in the in-memory container storage 610. Therefore, a container access command generated by the container may be transferred to the in-memory container storage 610.

The in-memory container storage engine 620 may generate the unified in-memory container storage 610 by unifying the main memory, the disk storage, and the remote storage. Also, the in-memory container storage engine 620 may process the disk access command by utilizing the main memory, the disk storage, and the remote storage in a unified manner.

In this case, the in-memory container storage 610 may be operated without separate modification, by providing a standard block storage-type interface through the in-memory container storage engine 620.

Hereinafter, the structure of the in-memory container storage engine according to the present invention will be described in detail with reference to FIG. 7.

Figure 7:
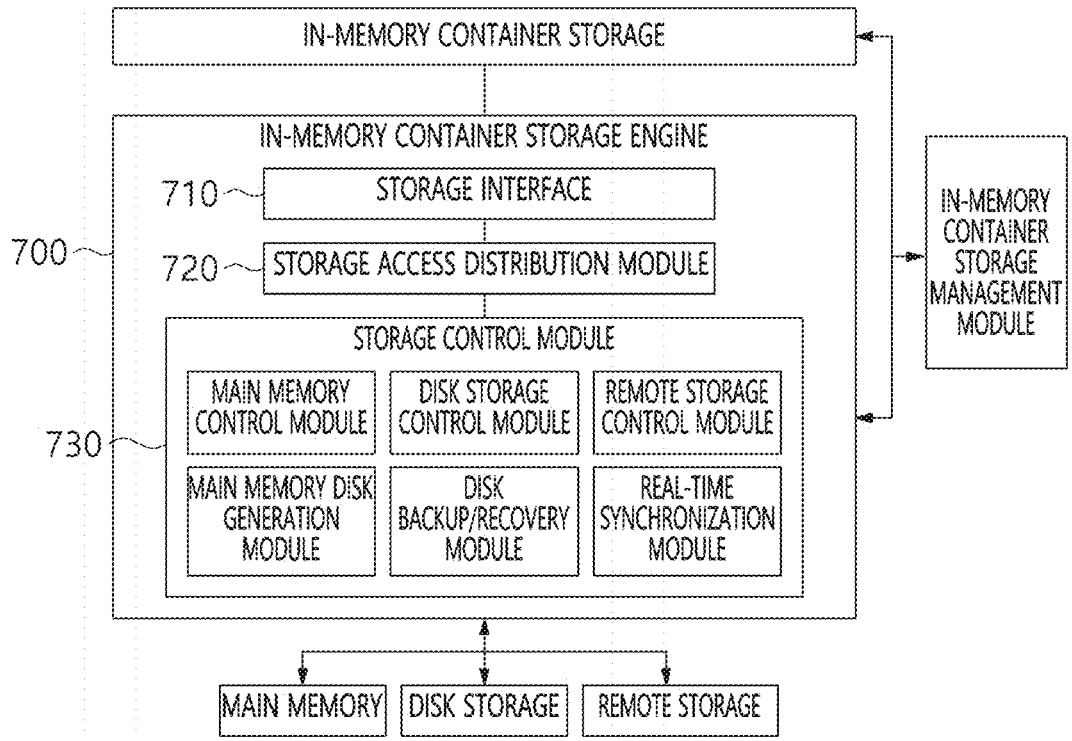
FIG. 7 is a diagram illustrating an example of the detailed structure of the in-memory container storage engine illustrated in FIG. 5.

Referring to FIG. 7, an in-memory container storage engine 700 may include a storage interface module 710, a storage access distribution module 720, and a storage control module 730.

First, the storage interface module 710 may provide a standard block storage-type interface, and may receive a disk access command generated by the container. The command received in this way may be transferred to the storage access distribution module 720.

The storage access distribution module 720 may determine whether a service is to be performed using main memory storage, disk storage or remote storage depending on the feature of the disk access command. Thereafter, the access command may be transmitted to a main memory control module, a disk storage control module, and a remote storage control module, which are included in the storage control module 730.

The storage control module 730 may include the main memory control module, the disk storage control module, the remote storage control module, a main memory disk generation module, a disk backup/recovery module, and a real-time synchronization module.

The main memory control module may process the disk access command using the main memory, whereby a high access speed may be provided.

For example, when the disk access command is received through the main memory control module, disk access commands transmitted on a block basis through the main memory disk generation module may be actually processed for read/write operations on the main memory that is accessible on an address basis. By means of this, pieces of data in a virtual disk may be generated and stored in the main memory.

The disk storage control module may process a virtual disk access command using the disk storage.

Figure 8:
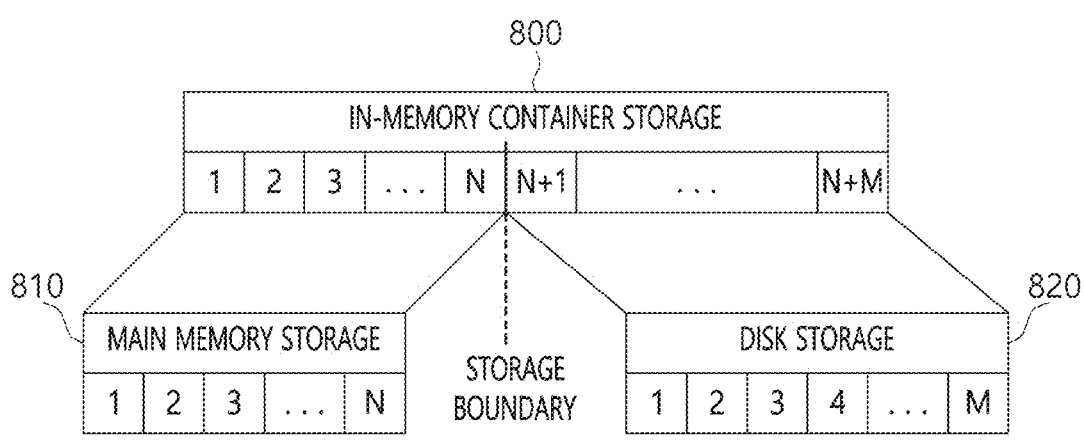
FIG. 8 is a diagram illustrating an example of in-memory container storage generation method according to the present invention.

FIG. 8 is a diagram illustrating an example of in-memory container storage generation method according to the present invention.

Referring to FIG. 8, a method for generating single hybrid-type in-memory container storage 800 by integrating main memory storage 810 with disk storage 820 is illustrated.

The in-memory container storage 800 may provide a standard block storage type, and may be generated by mapping the area of the main memory storage 810 to the first part of the storage and mapping the area of the disk storage 820 to the latter part of the storage.

For example, an area corresponding to block IDs 1 to N of the main memory storage 810 may be mapped to the area of corresponding to block IDs 1 to N of the in-memory container storage 800. Further, an area corresponding to block IDs 1 to N of the disk storage 820 may be mapped to the area corresponding to block IDs N+1 to N+M of the in-memory container storage 800. Here, a storage boundary for distinguishing the area of the main memory storage 810 from the area of the disk storage 820 may be set between the block IDs N and N+1 of the in-memory container storage 800.

Figure 9:
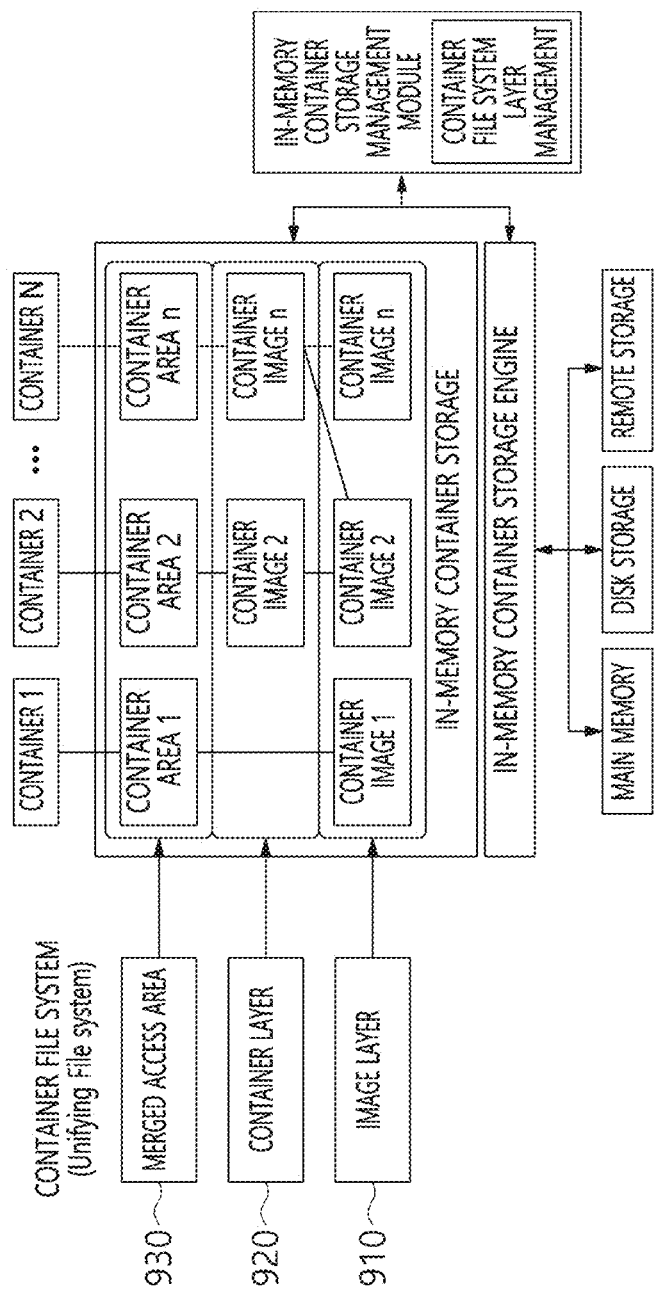
FIG. 9 is a diagram illustrating an example of a container file system implemented in an in-memory storage according to the present invention.

FIG. 9 is a diagram illustrating an example of a container file system implemented in in-memory storage according to the present invention.

Referring to FIG. 9, a file system used in a container according to the present invention may be configured in in-memory container storage.

In accordance with the present invention, in order to drive the main memory of the container, the basic file system of the container may be driven in the main memory. For example, the container may individually provide files required by a user (tenant) using a unifying-file system function included in the kernel of an existing Linux environment.

Here, the unifying-file system function is the concept of mounting multiple file systems at a single mount position, and is capable of unifying and processing all directory entries on a Virtual File System (VFS) layer instead of generating a new file system type. Therefore, when the unifying-file system function is used, a logical combination of directory entries of a lower file system are merged with directory entries of an upper file system, and thus logical combinations of all mounted file systems may be generated. Therefore, it may become possible to locally manage all file systems shared by the system and locally search for files, and file management for entire sharing of the file systems may be facilitated.

That is, as illustrated in FIG. 9, the container file system according to the present invention may be a unified file system, and may be configured in the form of a layer.

Respective layers classified into a merged access area 930, a container layer 920, and an image layer 910 may be operated by creating and mounting a specific directory in the in-memory container storage.

First, the container layer 920 may be a layer enabling writing, and may be generated on an uppermost layer to allow respective containers to have their own states. In this case, after the containers are generated, all modification tasks may be performed on the container layer 920. Further, since read/write operations on the container layer 920 are performed in the memory, they may be performed at high speed. Further, the container layer 920 may include information about a difference between an actual image and a container image so as to improve the efficiency of file management.

The image layer 910 may be a read-only layer, and may be shared with other containers. In this case, the image shared with an additional layer may be operated on the container layer 920 in various forms.

That is, the image layer 910 may share the container image with a variety of different systems, thus improving the efficiency of file management.

For example, as illustrated in FIG. 9, the container image of the image layer 910 must be pulled from a public repository (e.g., github) when the corresponding container is distributed. In this case, in order to guarantee performance, the image layer 910 may be efficiently operated by storing an image used by a container system in a local area or previously fetching the image therefrom.

The present invention proposes a method for storing a previously pulled image in shared storage so as to reuse the previously pulled image. As described above, a large number of images in the image layer 910 may be present in the in-memory container storage, and the container images of the entire system may be backed up and stored in the disk storage or the remote storage, and may be added to the image layer 910. By means of this, container images of the entire system may be used by the container layer 920, and may also be continuously provided through the merged access area 930.

The merged access area 930 may include link information of layers so as to access all file systems of the container layer 920 and the image layer 910, and may enable file access by sharing the link information with the user.

Figure 10:
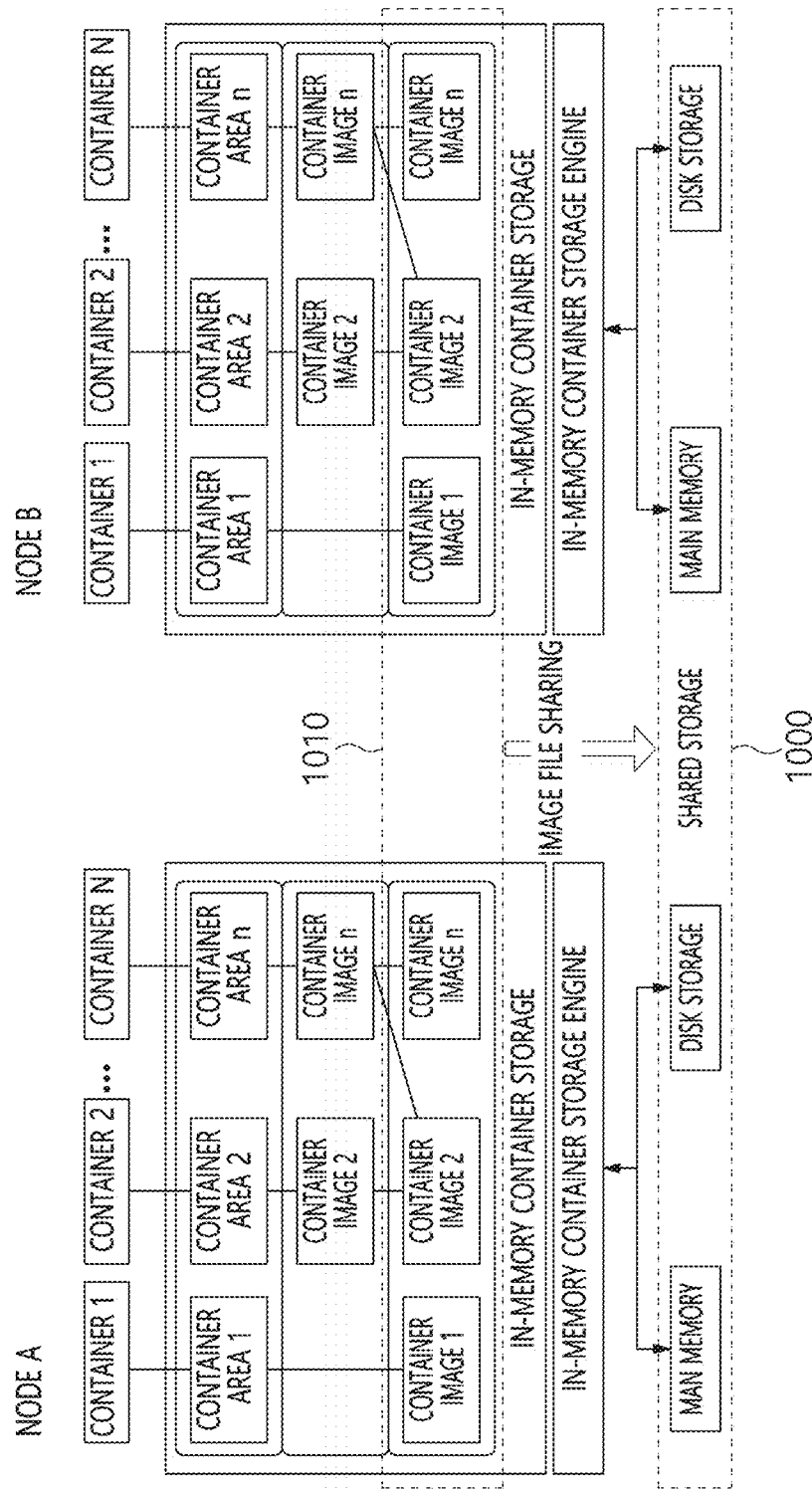
FIG. 10 is a diagram illustrating an example of an image-sharing environment for the in-memory container storage according to the present invention.

FIG. 10 is a diagram illustrating an example of an image sharing environment of in-memory container storage according to the present invention.

Referring to FIG. 10, in order for the in-memory container storage according to the present invention to provide shared data, shared storage 1000 may be used.

For example, the shared storage 1000 may be a network file storage (e.g., a storage area network (SAN), network attached storage (NAS), or the like) or storage connected to a local disk.

Referring to FIG. 10, the image sharing environment according to the present invention may have a structure in which container images stored in the shared storage 1000 are provided to a user in response to a request from the user.

For example, a shared-management function may be provided through the container file system layer management module of the in-memory container storage management module illustrated in FIGS. 5 and 7, and shared data 1010 may be provided to the user by individually configuring areas for file sharing and providing the areas to the user.

Hereinafter, a process in which nodes, each having in-memory container storage for providing shared data, as shown in FIG. 10, share data with each other will be described in detail with reference to FIG. 11.

Figure 11:
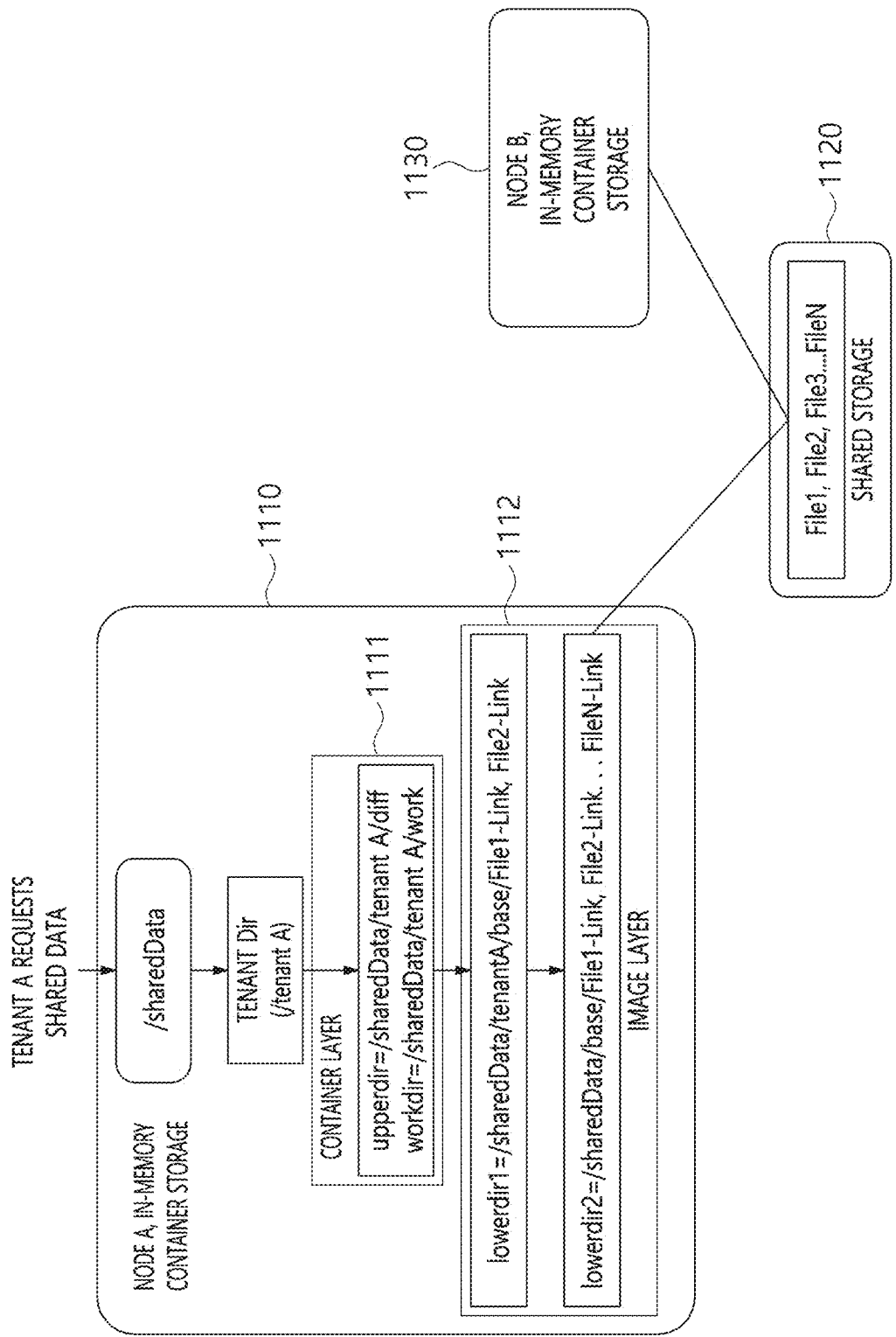
FIG. 11 is a diagram illustrating an example of the configuration of a user (tenant)-sharing environment according to the present invention.

FIG. 11 illustrates a user (tenant) access method that may improve security by distinguishing and providing pieces of data desired to be shared depending on the groups that use the shared data, rather than sharing all data upon sharing the data.

First, in response to a request received from a user (tenant), the directory (/sharedData/tenant) of the tenant may be created in the in-memory container storage 1110 of node A, and one directory diff may be created below the tenant's directory (/sharedData/tenant) and may be mapped to the tenant's directory in a container layer 1111) (i.e., an upper directory). Here, for file system management, deduplicated data may be used as the tenant's data. The directory diff created in this way may correspond to a container layer, and may correspond to data that is used when the tenant accesses a file or that is stored after being edited/corrected by the tenant. Further, a work directory may be created below the tenant's directory, and may be mapped to the tenant's directory. The work directory may correspond to the user data storage area of the container layer.

Furthermore, a lower directory (lowerdir2=/sharedData/base/File1-Link, File2-Link . . . FileN-Link/) located in the lowermost portion of an image layer 1112 may be a management point for storing all file links of the shared storage 1120, and may be set to (/sharedData/base . . . ).

In this case, in the image layer 1112, a lower directory lowerdir2=/sharedData/base/File1-Link, File2-Link . . . FileN-Link/) may be exposed as a management system so that the tenant may select a required file, whereby link information may be arranged only for the file selected by the tenant through association of the lower directory (lowerdir1=/sharedData/tenantA/base/File1-Link, File2-Link) created in the image layer 1112 with the upper directory.

By means of this process, the user (tenant) may view only the file selected thereby.

Therefore, the tenant may be provided with a shared file through the tenant directory shared with the tenant, and lower directories may remain unchanged. That is, because the lower directories are used only for reading, the problem of incurring writing when multiple tenants share data with each other may be efficiently prevented. When a change occurs in a file in the lower directories, the change is recorded in the upper directory, and thus all shared files may be efficiently managed.

Figure 12:
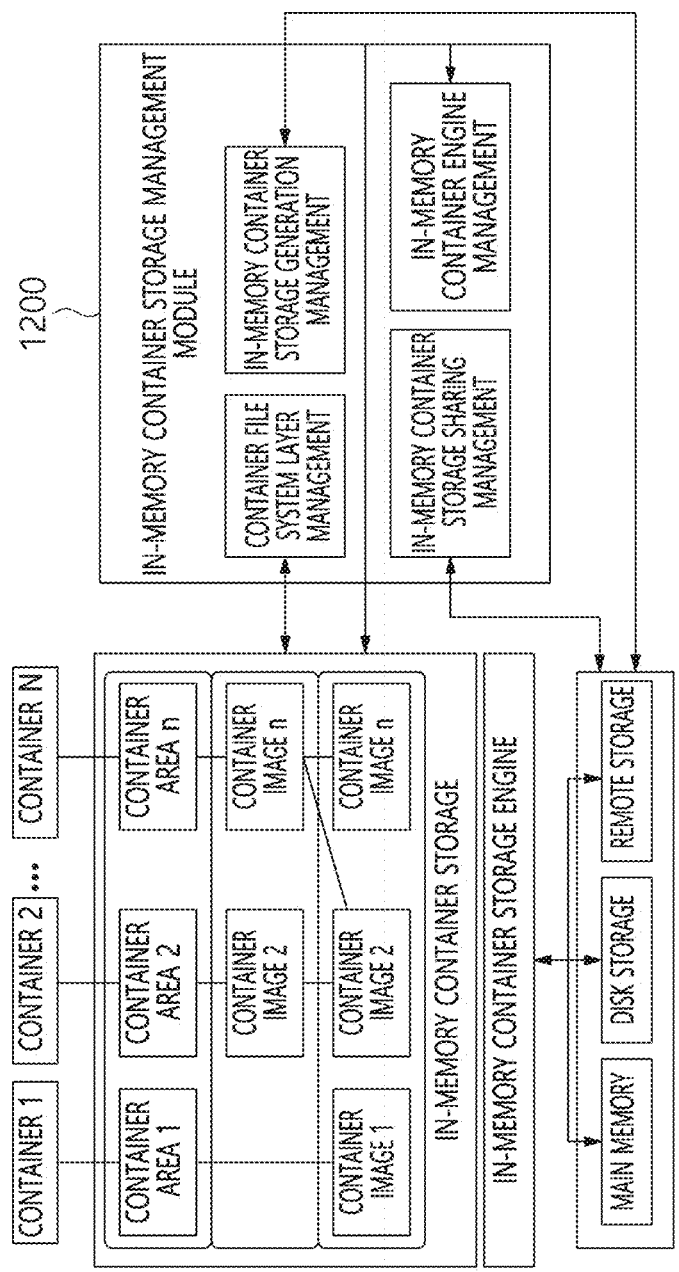
FIG. 12 is a diagram illustrating an example of the detailed structure of an in-memory container storage management module illustrated in FIG. 5.

FIG. 12 is a diagram illustrating an example of the detailed structure of the in-memory container storage management module illustrated in FIG. 5.

Referring to FIG. 12, an in-memory container storage management module 1200 according to the present invention may include a container file system layer management module, an in-memory container storage generation management module, an in-memory container storage sharing management module, and an in-memory container engine management module.

The container file system layer management module may monitor the current state and driving states of a container file system. Also, when the in-memory container storage is used, a container system may be generated, and the state thereof may be managed.

The in-memory container storage generation management module may generate in-memory container storage when it is desired to configure the corresponding container in an in-memory form in response to a request from the user (tenant). In this case, when the generation of the in-memory container storage is completed, the container file system layer management module may generate the container file system of the corresponding system.

The in-memory container storage sharing management module may perform a task of generating a shared file system between storages to share an image layer in response to a request from the user (tenant) and synchronizing the shared file system. Here, link information of the image layer may be merged into a single system and may be synchronized.

The in-memory container storage engine management module may generate and drive the in-memory container storage driver of the corresponding system, and may monitor the state of the in-memory container storage driver.

Figure 13:
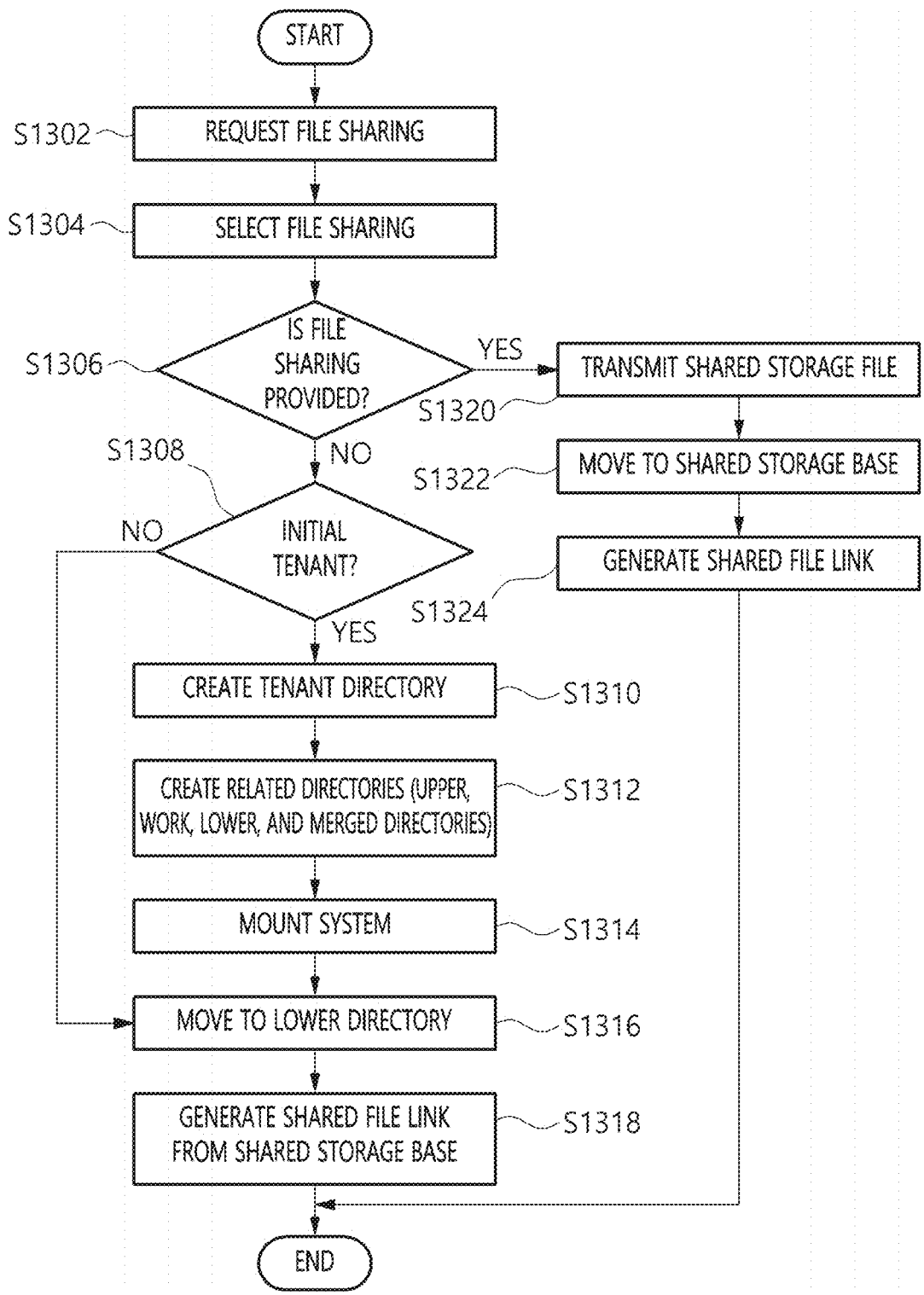
FIG. 13 is an operation flowchart illustrating an example of a detailed process for managing data sharing by the in-memory container storage management module according to the present invention.

Hereinafter, a process in which the in-memory container storage management module performs management of data sharing according to the present invention will be described in detail with reference to FIG. 13.

First, a user (tenant) may access the corresponding system to request and select file sharing at steps S1302 and S1304.

Here, users (tenants) may be divided into a tenant who gets file sharing and a provider who provides file sharing.

Therefore, whether the tenant is the provider who provides file sharing may be determined at step S1306.

When it is determined at step S1306 that the tenant will be the tenant who gets file sharing, whether the corresponding tenant is an initial tenant may be determined at step S1308.

When it is determined at step S1308 that the tenant is an initial tenant, a user directory may be created at step S1310, and related directories may be created at step S1312, and thus the entire system environment may be mounted at step S1314.

Thereafter, after the in-memory container storage management module has moved to a lower directory of the user directory at step S1316, information about a link to a shared file requested by the tenant may be retrieved from a shared storage base, and then a shared file link may be generated at step S1318.

On the other hand, when it is determined at step S1308 that the tenant is not an initial tenant, the in-memory container storage management module immediately moves to the lower directory of the user directory at step S1316, and may retrieve information about a link to a shared file requested by the tenant from the shared storage base, and then generate a shared file link at step S1318.

Further, when it is determined at step S1306 that the tenant is a provider who provides file sharing, the in-memory container storage management module may access the shared storage to upload a file at step S1320, move to the shared storage base at step S1322, and generate a shared file link at step S1324.

Figure 14:
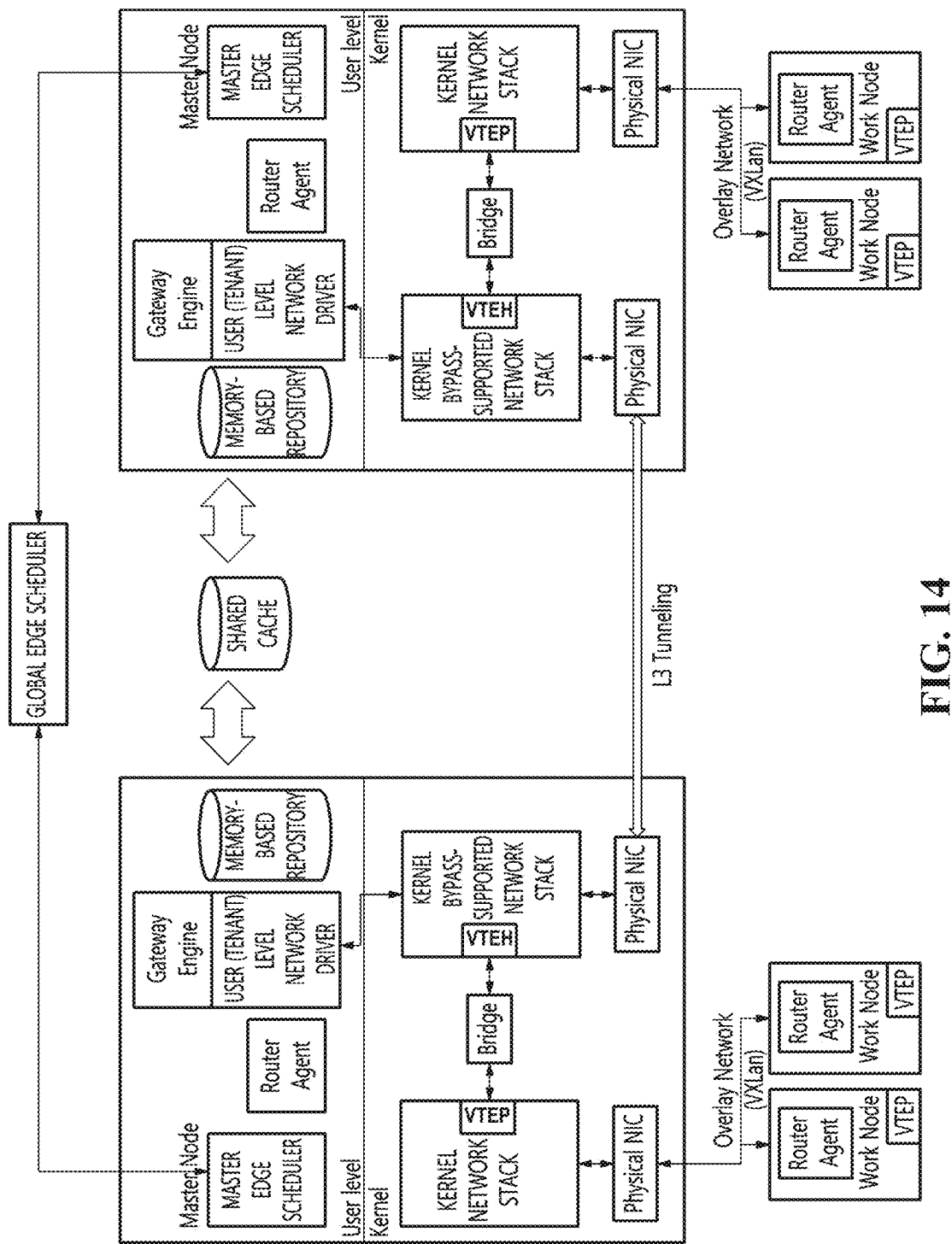
FIG. 14 is a diagram illustrating an example of a connection structure between clusters according to the present invention.

FIG. 14 is a diagram illustrating an example of a connection structure between clusters according to the present invention.

The present invention is intended to smoothly provide an edge computing service and maximize the efficiency of an environment in which a large amount of data is processed and distributed. Therefore, considerations related to a vertical distribution environment between a core cloud and a cloud edge and a horizontal distribution environment between cloud edges are essentially required in order to provide a collaboration function for edge computing.

For example, in order to connect distributed environment services for edge computing, which are locally distributed and arranged (deployed) to cross clusters, to a high-speed network, technology for interconnecting clusters and distributing and arranging services at high speed is essential. Therefore, the connection structure between clusters must be designed in consideration of a network connection function on multiple cluster nodes of the cloud edge system and interfaces thereof. Furthermore, together with the network connection function, a fast data movement and repository association function is also required.

Referring to FIG. 14, the service connection structure according to the present invention refers to a network connection function on multiple clusters for core-edge connection and edge-edge connection. In other words, the network connection function may correspond to a function of associating different networks with each other so as to use a near edge attributable to a mobile service of a cloud edge and provide a seamless service.

In this case, the present invention may provide a high-speed gateway (gateway engine) function to connect multiple clusters to a network and a basic routing (router agent) function for recognition in the cluster. The gateway and the router may perform a management function on the cluster, and may be locally distributed through a global edge scheduler.

Here, the high-speed gateway is a network connection scheme for connecting and operating multiple clusters at high speed, and may connect the clusters through tunneling between two networks.

Reliable data transmission may be guaranteed by encapsulating a payload in a tunneling interval through tunneling and utilizing a specific protocol. Further, tunneling may be applied to layers L7, L3, and L2, among seven layers of the Internet. As tunneling on a lower-level layer is supported, multiple protocols used on an upper layer may be used without change, and fast performance may be realized.

In FIG. 14, an example in which two clusters are connected using layer L3 tunneling is illustrated. There are many cases where the protocol used for tunneling in which clusters are connected in this way is processed at speed lower than that of other protocols. In order to overcome these cases, the present invention connects a user-level network driver (Data Plane Development Kit: DPDK) for kernel bypass to the tunneling network.

Also, an interface between a master node and a worker node may be connected to a tunneling interface through a bridge, and may be connected to a network implemented as an existing overlay network.

More specifically, by means of the cluster connection structure illustrated in FIG. 14, a high-speed gateway engine function, a global sharing cache function, a kernel bypass-supported network stack configuration function, a user level network driver management function, and a router agent function may be provided.

The high-speed gateway engine function may perform a multi-cluster tunneling function in layer L3 using a user-level network driver.

The global shared cache function may be a repository function of generating high-speed shared storage based on a network-based storage system using memory-based storage, connecting the shared storage to a local shared cache, and then sharing data, and may exploit storage present in a master node as network-based shared storage.

The kernel bypass-supported network stack configuration function may correspond to a function such as a library for kernel bypass, device management, and configuration management (e.g., DPDK hardware-supported stack).

The user level network driver management function may correspond to a Common-Line Interface (CLI) function (a network driver provided at an application stage, e.g., Cisco FD.io or the like) of distributing, connecting, and managing a user-level network driver.

The router agent function may be executed in all nodes, may configure a path using endpoint resources synchronized with other clusters, and may activate connections among all clusters. In this case, rules for iptables may be established, wherein the router agent may have a routable table of a gateway engine so as to communicate with the gateway engine in association with the gateway engine.

Figure 15:
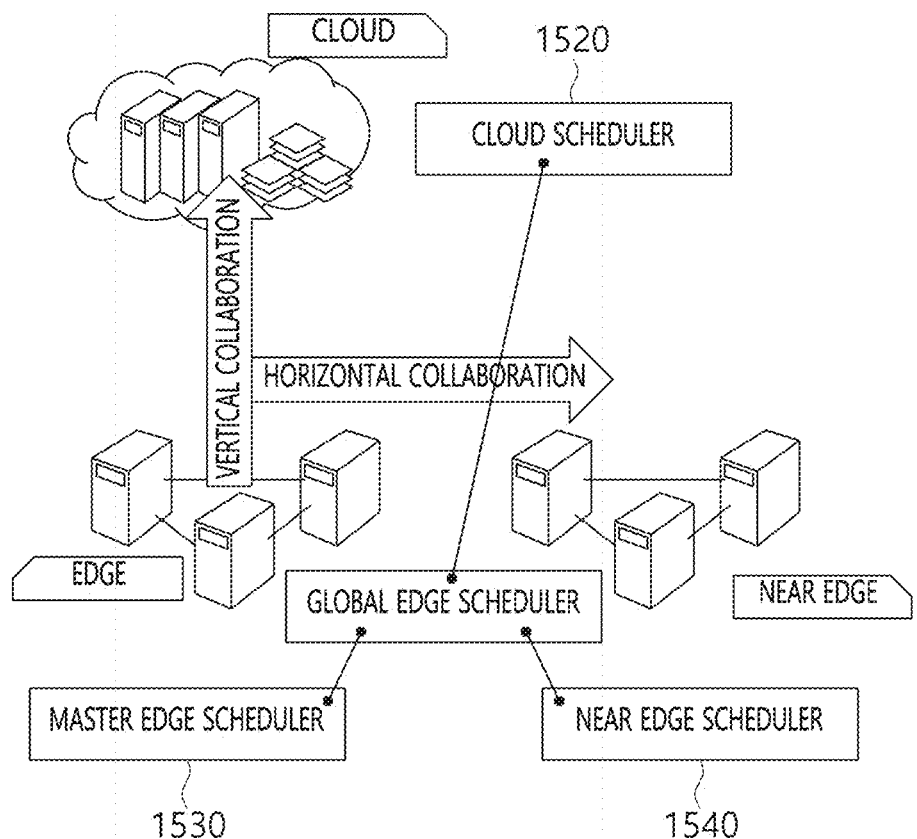
FIG. 15 is a diagram illustrating an example of the configuration of an edge service system scheduler according to the present invention.

FIG. 15 is a diagram illustrating an example of the configuration of an edge service system scheduler according to the present invention.

The scheduler of an existing edge service system may be a fixed scheduler defined by a specific logic, and such a nonadaptive scheduler may include a structure having difficulty in optimization for active deployment or usage of resources against a change in service scale or a usage pattern.

Therefore, the present invention is intended to propose a new scheduler based on multiple clusters to overcome problems in the existing scheduler.

The target to which the scheduler proposed in the present invention is to be applied may correspond to a resident container for executing a monolithic application or microservice and a non-resident container for executing a Function as a Service (FaaS).

Referring to FIG. 15, the edge service system scheduler according to the present invention may include four types of schedulers including a global edge scheduler 1510 and three schedulers 1520, 1530, and 1540 corresponding to 3 locations.

The global edge scheduler 1510 may correspond to a scheduler for connecting the cloud scheduler 1520, the master edge scheduler 1530, and the near edge scheduler 1540 to each other.

The cloud scheduler 1520 may correspond to the scheduler of a public cloud and a private cloud.

The master edge scheduler 1530 may correspond to the scheduler of an edge (a master edge) on which a principal service is executed.

The near edge scheduler 1540 may correspond to the scheduler of a near edge located near the master edge.

The edge service system scheduler configured in this way may be an intelligent scheduler based on analysis of log data while being a scheduler enabling a policy to be dynamically established. Further, the edge service system scheduler may minimize costs attributable to a change in scheduling policy, and may minimize a waiting time and a delay time.

Furthermore, by utilizing the edge service system scheduler illustrated in FIG. 15, horizontal collaboration and vertical collaboration in an edge service may be applied at a system level.

For example, the edge service system scheduler according to the present invention may correspond to a complex scheduler in which a leveled scheduler and a shared scheduler are combined with each other.

Here, the leveled scheduler may be a scheduler for sequential processing, and the shared scheduler may be a scheduler for searching for an optimal condition through mutual contention.

Figure 16:
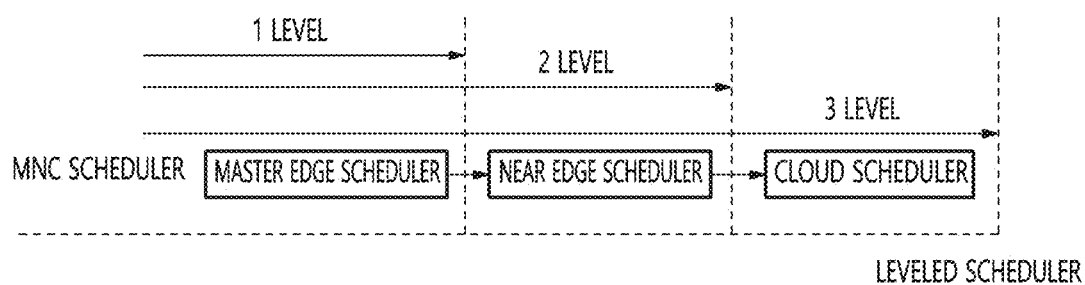
FIG. 16 is a diagram illustrating an example of a leveled scheduler according to the present invention.

For example, the scheduler illustrated in FIG. 16 may have the form of a 3-leveled scheduler, and may perform scheduling tasks in the order of a master edge scheduler, a near edge scheduler, and a cloud scheduler. If resource allocation succeeds through the master edge scheduler that is at level 1, execution of the near edge scheduler that is at level 2 and the cloud scheduler that is at level 3 may be skipped. However, when resource allocation through the master edge scheduler that is at level 1 fails, the corresponding task may be sequentially transferred to the scheduler at the next level. A service developer may apply load distribution of edge service and collaboration between services at a system level by using the leveled scheduler.

In this way, the leveled scheduler sequentially performs tasks whereas the shared scheduler may be operated in a contention mode between individual schedulers. For example, the shared scheduler may be operated using a scheme which processes the task by simultaneously requesting a task from two or more schedulers, and thereafter receiving candidates from respective schedulers and selecting the most suitable one from among the candidates.

Figure 17:
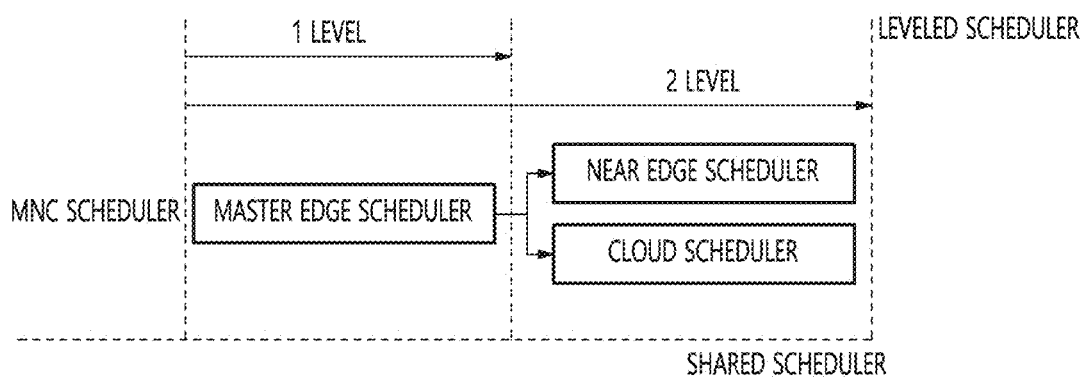
FIG. 17 is a diagram illustrating an example of a shared/leveled complex scheduler according to the present invention.

In another example, the scheduler illustrated in FIG. 17 may correspond to a leveled scheduler composed of two levels, and may be a complex scheduler proposed in the present invention in which, at level 2, a near edge scheduler and a cloud scheduler are implemented as a shared scheduler.

If resource allocation fails through the master edge scheduler that is at level 1, the complex scheduler simultaneously requests a task from the near edge scheduler cloud scheduler in a contention mode at level 2. Thereafter, the complex scheduler may receive candidates from the near edge scheduler and the cloud scheduler, may select the most suitable one from among the candidates, and may then process the task.

Figure 18:
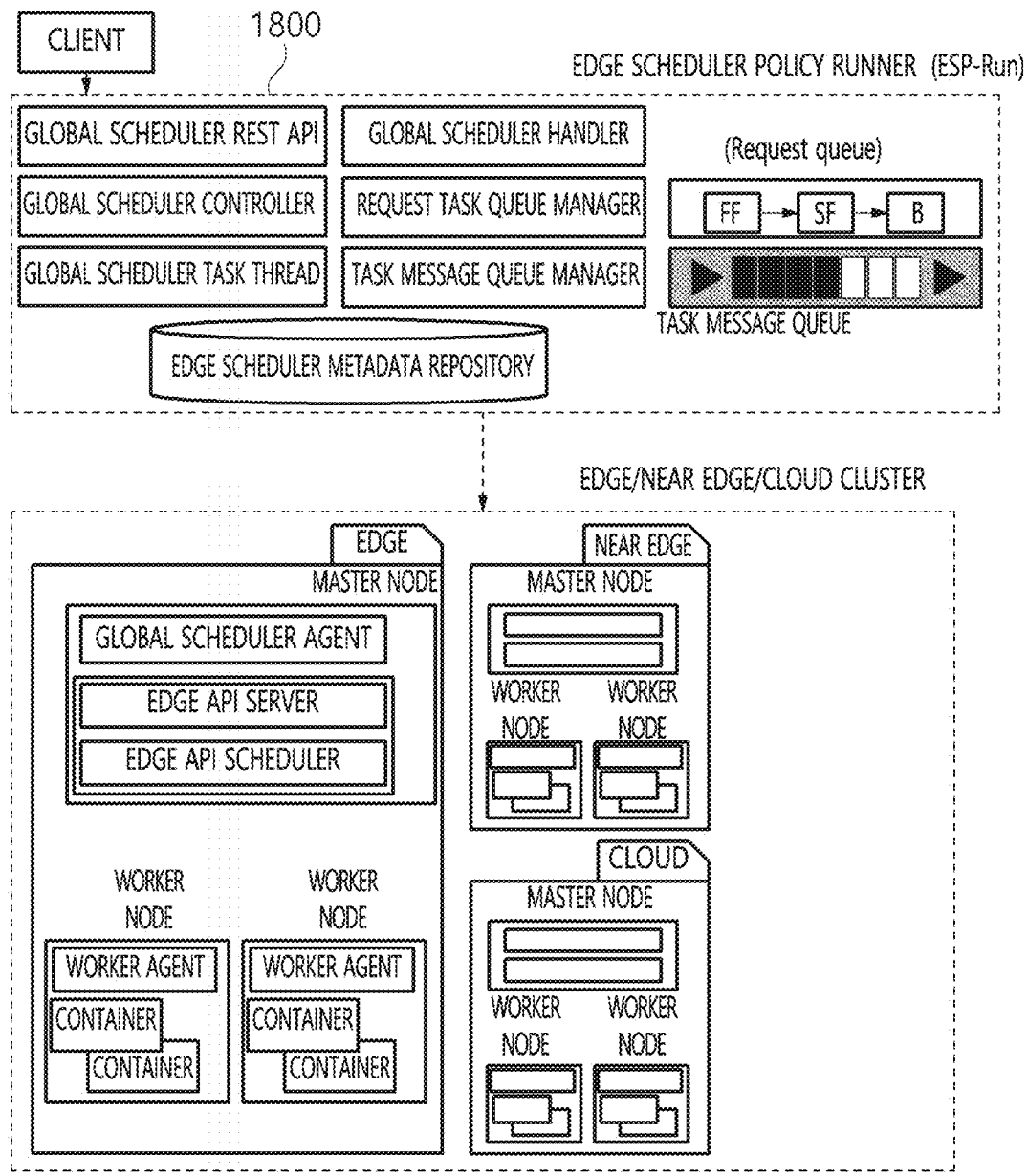
FIG. 18 is a diagram illustrating an example of a scheduler policy runner of an edge service system according to the present invention.

FIG. 18 is a diagram illustrating an example of a scheduler policy runner of an edge service system according to the present invention.

Referring to FIG. 18, a scheduler policy runner for executing a complex scheduler according to the present invention may include an edge scheduler policy runner 1800 and clusters (edge/near edge/cloud clusters) on which containers are to actually run.

Functions of principal components constituting the scheduler policy runner according to the present invention are shown in Table 2.

TABLE 2

| Component | Function |
| --- | --- |
| Global scheduler REST API | REST API corresponding to scheduler which requests allocation of a related application container from a user interface or a command tool |
| Global scheduler handler | Component which processes global scheduler RESTful (REST) application program interface (API) |
| Request queue manager | Component which receives container allocation requests from a global scheduler handler, and stores and manages data related to the container allocation requests |
| Global scheduler controller | Component which fetches scheduling request data from a request queue, and creates and executes global scheduler task threads |
| Global scheduler task thread | Thread which converts a scheduler task into a message format to be transferred to the global scheduler agent of the corresponding master node, and stores the message in a task message queue |
| Edge cluster metadata repository | Repository which stores pieces of metadata related to an edge cluster |
| Work message queue | Repository which stores scheduler task messages between an edge scheduler policy runner and a cluster |
| Global scheduler agent | Component which receives a scheduler task message corresponding thereto from the task message queue in the master node of a cluster and calls a REST API |
| Edge (cloud) scheduler | Component which senses an unassigned container and selects a worker node on which the container is to run |
| Worker agent | Agent which runs a container on a worker node |

Hereinafter, the processing flow of the scheduler policy runner according to the present invention will be described in detail with reference to FIG. 19.

Figure 19:
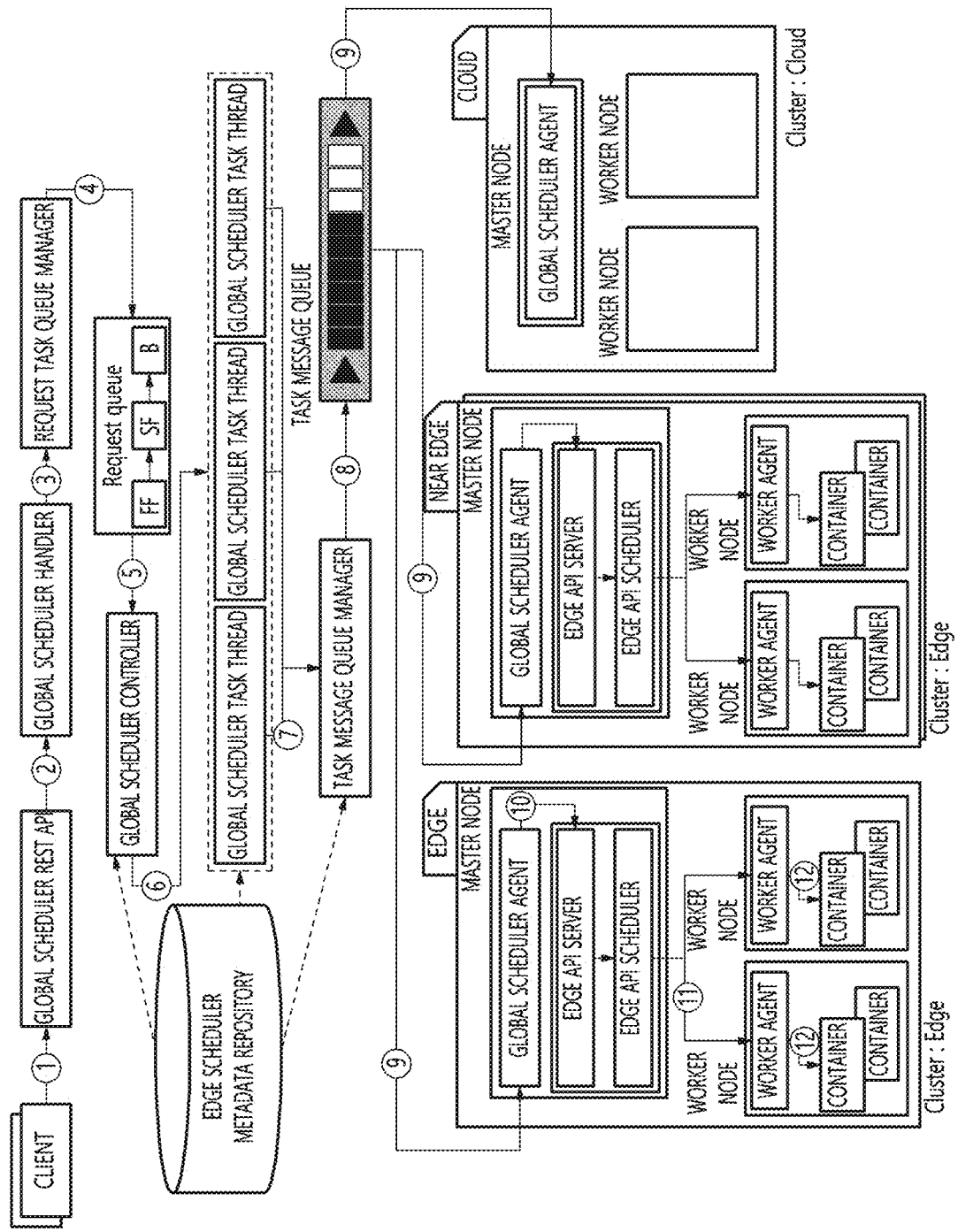
FIG. 19 is a diagram illustrating an example of the processing flow of the scheduler policy runner illustrated in FIG. 18.

Referring to FIG. 19, a process of creating and running a container requested by a client on a worker node is described as follows.

First, when a user (tenant) calls a REST API corresponding to container creation, a global scheduler handler may be executed to process the called REST API.

Thereafter, the global scheduler handler may transmit the requested data to a request queue manager, and the request queue manager may store the requested data in a queue.

Thereafter, the global scheduler controller may perform a scheduling task (work) by fetching data to be processed from the request queue in consideration of priority, generating a global scheduler task (work) thread, and transferring the data to be processed.

Thereafter, the global scheduler task thread may analyze the requested task, convert the scheduler task into a message format to be requested from the corresponding cluster, and transfer the message to the task message queue manager.

Thereafter, when the task message queue manager stores the received message in the task message queue, the global scheduler agent of the cluster may check whether a message corresponding to the edge and the near edge is present in the task message queue, and then fetch the corresponding message from the task message queue.

Thereafter, the global scheduler agent may analyze the fetched message, and may call the corresponding API to the edge API server thereof.

Thereafter, the edge scheduler may generate and run the requested container through worker agents present in worker nodes.

Figure 20:
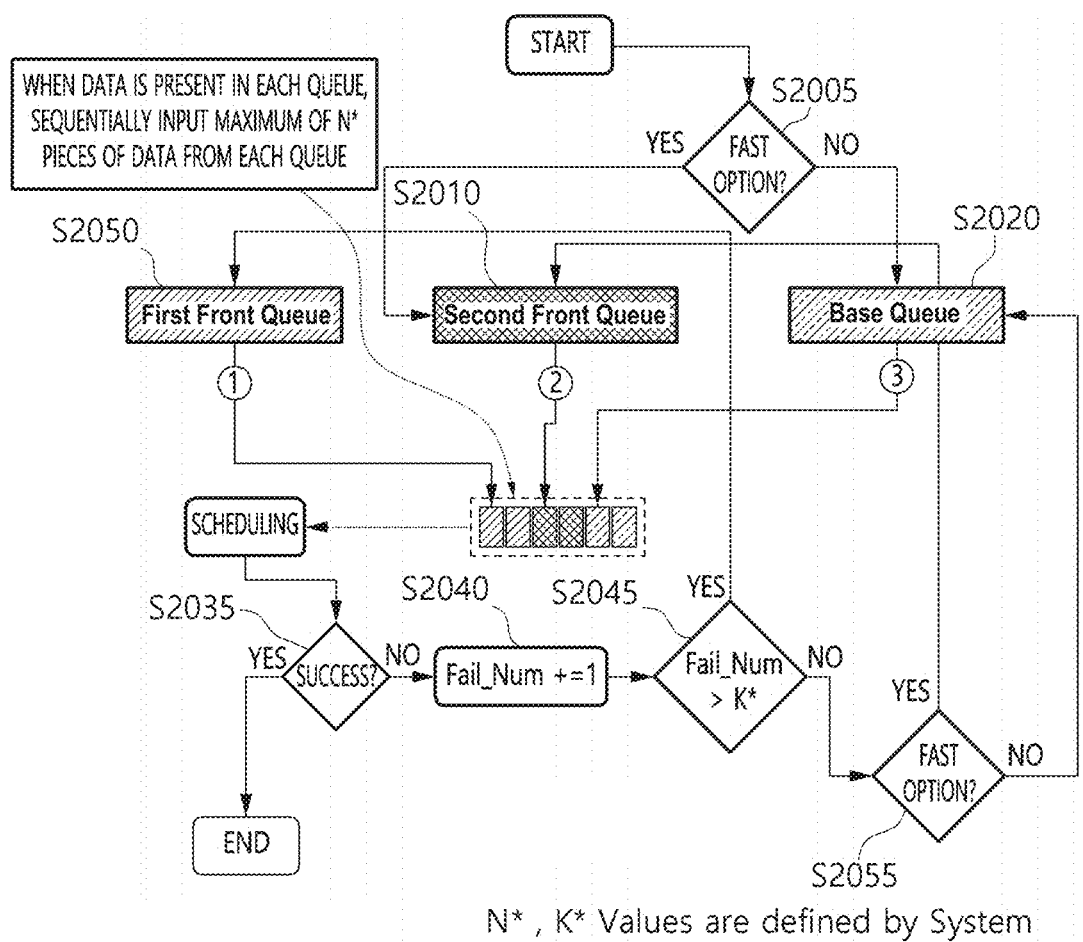
FIG. 20 is an operation flowchart illustrating an example of a processing order of a 3-stage request queue in the scheduler policy runner illustrated in FIG. 18.

FIG. 20 is an operation flowchart illustrating an example of a processing order of a 3-stage request queue of the scheduler policy runner illustrated in FIG. 18.

The scheduler policy runner proposed in the present invention may divide the request queue into three stages and process requests so as to preferentially process a request which was made to request scheduling, but repeatedly failed, or process a request having a priority option prior to a basic scheduling request.

Here, the 3-stage request queue may be configured in the order of a first front queue FF, a second front queue SF, and a base queue B.

The first front queue may correspond to a queue for preferentially processing a request which was made to request scheduling, but repeatedly failed.

The second front queue may correspond to a queue for processing a request having a priority option prior to a basic scheduling request.

Referring to FIG. 20, in processing by the three-stage request queue of the edge scheduler policy runner, whether requested data has a priority option (e.g., FAST option) may be determined at step S2005. When there is a priority option, the requested data may be stored in the second front queue at step S2010, whereas when there is no priority option, the requested data may be stored in the base queue at step S2020.

Next, whether pieces of data are present in the queues in the order of the first front queue, the second front queue, and the base queue may be checked, and a preset number (N*) of pieces of tasks may be sequentially stored in the scheduling task queue from each queue, and thus the scheduling may be attempted at step S2030.

Thereafter, whether scheduling has succeeded is determined at step S2035. When it is determined that scheduling has failed, the number of failures for each request Fail_Num may be increased by 1 at step S2040, and whether the number of failures is greater than the preset number of failures K* may be determined at step S2045.

When it is determined at step S2045 that the number of failures is greater than the preset number of failures K*, the request may be stored in the first front queue at step S2050.

Further, when it is determined at step S2045 that the number of failures is not greater than the preset number of failures (K*), whether there is a priority option may be determined again at step S2055. When it is determined that there is a priority option, data may be stored in the second front queue at step S2010, whereas when it is determined that there is no priority option, the corresponding data may be stored in the base queue at step S2020.

Further, when it is determined at step S2035 that scheduling has succeeded, the scheduling task may be terminated.

In this case, the scheduling task illustrated in FIG. 20 may be repeated until all request data remaining in the three-stage task queue is processed, and the edge scheduler policy runner may wait for request data when there is no data.

Figure 21:
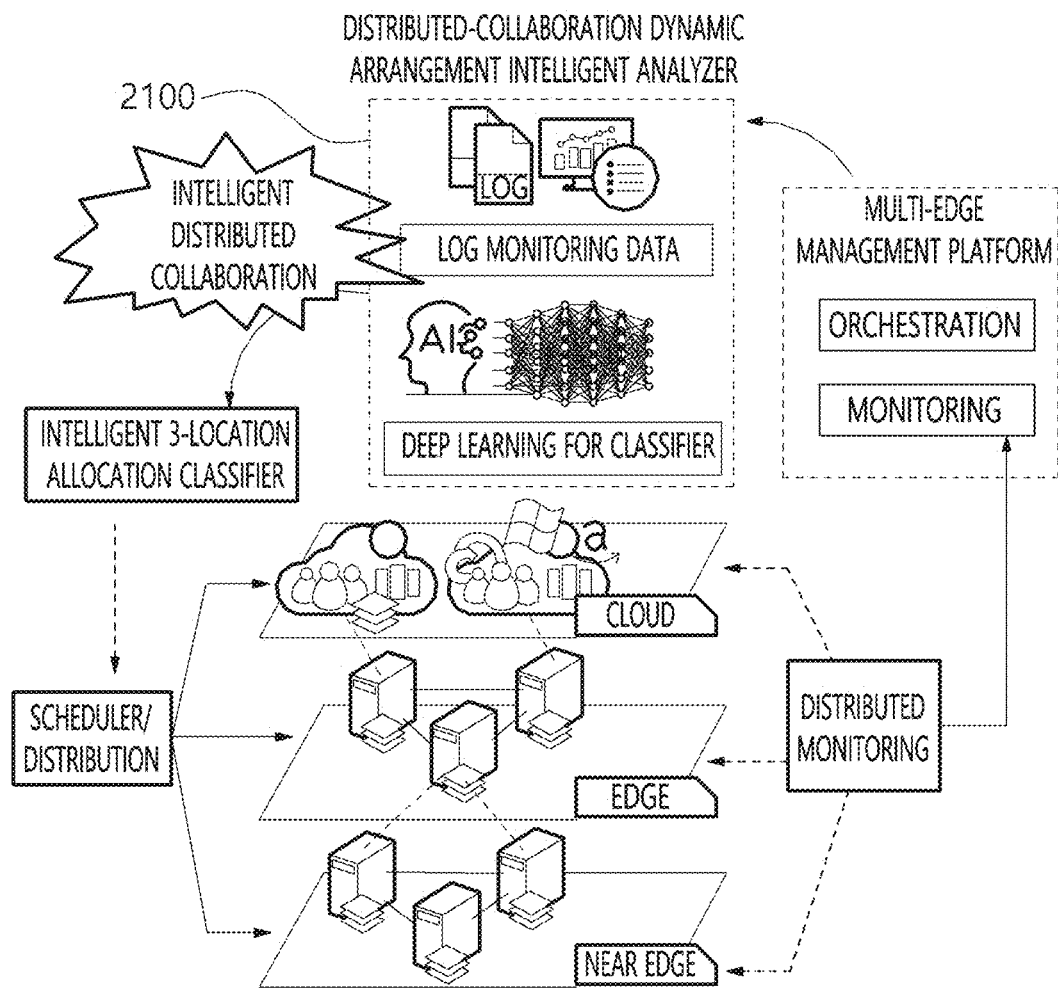
FIG. 21 is a diagram illustrating an example of dynamic arrangement for distributed collaboration between services based on an intelligent scheduler according to the present invention.

FIG. 21 is a diagram illustrating an example of dynamic arrangement connection for distributed collaboration between services based on an intelligent scheduler according to the present invention.

Referring to FIG. 21, the scheduler of an edge service system proposed in the present invention may correspond to an intelligent scheduler rather than a fixed scheduler.

For example, the edge service system proposed as illustrated in FIG. 21 may collect real-time monitoring data and logs for a cloud, an edge, and a near edge based on a distributed collaboration dynamic arrangement intelligent analyzer 2100, and may dynamically arrange (deploy) various services by applying AI analysis such as deep learning to the collected data.

Figure 22:
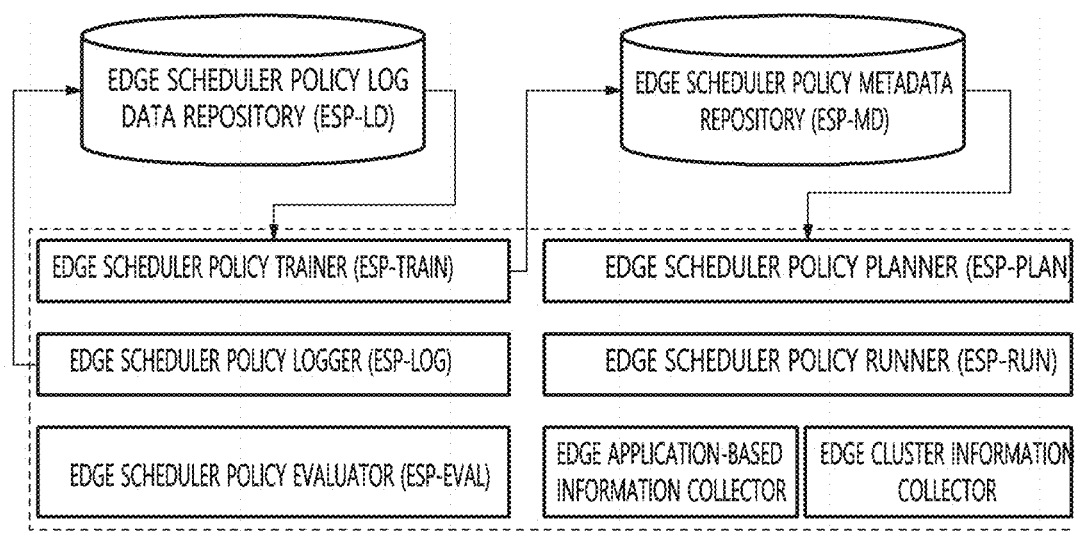
FIG. 22 is a diagram illustrating an example of an edge service system to which an intelligent scheduler is applied according to the present invention.

FIG. 22 is a diagram illustrating an example of an edge service system to which an intelligent scheduler is applied according to the present invention.

The edge service system proposed in the present invention may need a large amount of history data when deriving an intelligent scheduler policy through artificial intelligence training.

Here, although it is impossible to construct the edge service system and immediately perform artificial intelligence training, training of the edge scheduler policy may be performed after history data is collected for a certain period of time.

The principal components constituting the edge service system illustrated in FIG. 22 and respective functions of the principal components are shown in Table 3.

TABLE 3

| Component | Function |
| --- | --- |
| Edge scheduler policy metadata repository | Repository which stores an edge scheduler policy (ESP) |
| Edge scheduler policy planner | Component which establishes a policy based on information collected by an edge application-based information collector and an edge cluster information collector |
| Edge application-based information collector | Component which collects a response speed, an actual CPU use rate, an actual memory use rate, and other resource usage status, for each application executed by an edge. |
| Edge cluster information collector | Component which collects information such as an actual CPU use rate and an actual memory use rate, for each of physical nodes constituting a cluster |

TABLE 3-continued

| Component | Function |
| --- | --- |
| Edge scheduler policy log data repository | Repository which stores the result of applying an edge scheduler policy through an edge scheduler policy logger |
| Edge scheduler policy trainer | Component which fetches history data from an edge scheduler policy log data repository and performs training |
| Edge scheduler policy evaluator | Component which evaluates an edge scheduler policy depending on the optimization degree after the edge scheduler policy is applied |
| Edge scheduler policy runner | Component which runs the best policy by evaluating various edge scheduler policies depending on the optimization degree after various edge scheduler policies are applied |
| Edge scheduler policy logger | Component which stores the run scheduler policy and results of application thereof as logs |

Figure 23:
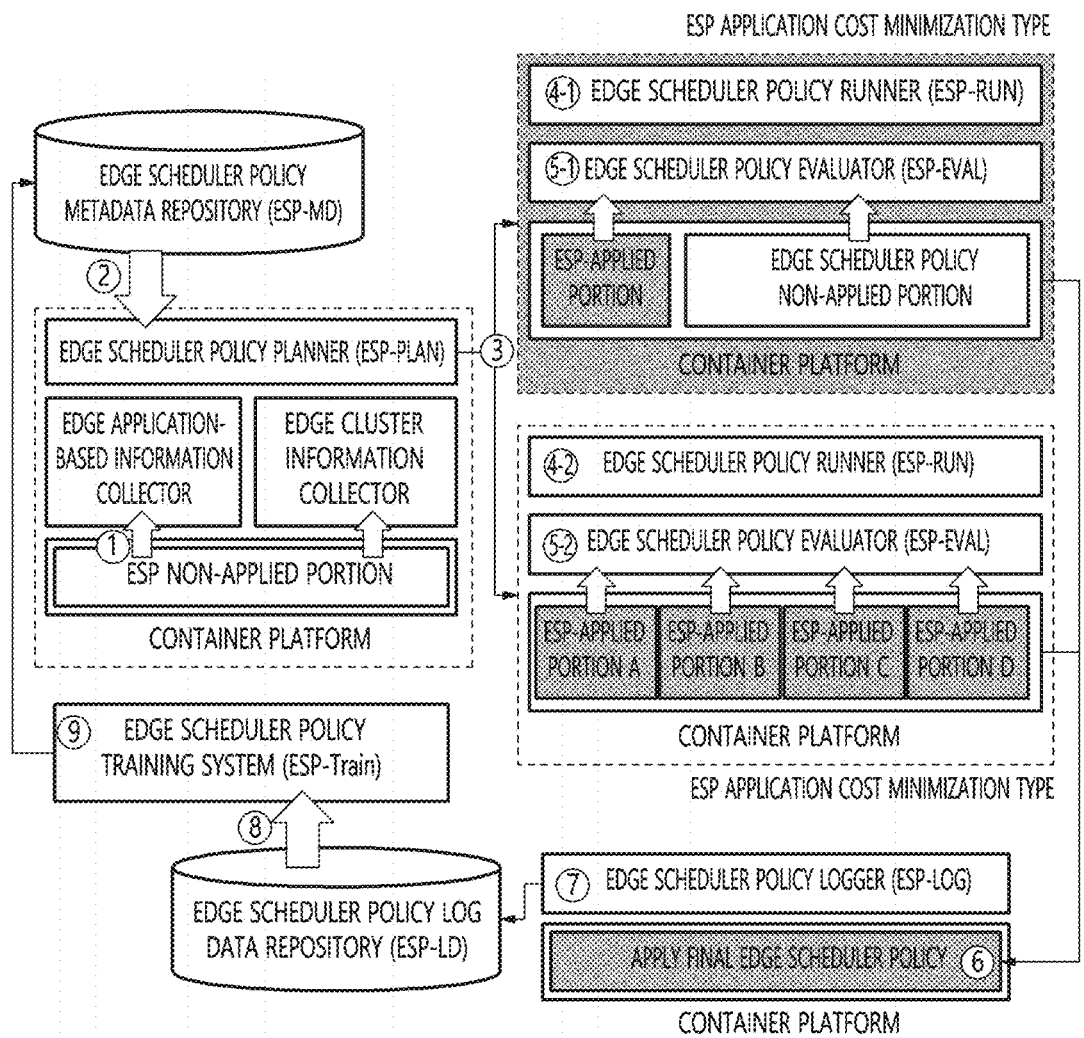
FIG. 23 is a diagram illustrating an example of a processing flow for optimization of an edge service system to which an intelligent scheduler is applied according to the present invention.

FIG. 23 is a diagram illustrating an example of a processing ow or optimization of an edge service system to which an intelligent scheduler is applied according to the present invention.

The core of optimization of the edge service system to which the intelligent scheduler is applied according to the present invention is to provide both a method of performing optimization at minimum cost and a method of performing optimization at speed that is as high as possible.

Referring to FIG. 23, the processing order of the edge service system to which the intelligent scheduler is applied may be realized such that, first, information in a container platform may be collected through an edge application-based information collector and an edge cluster information collector.

Thereafter, an edge scheduler policy planner may select a policy from the edge scheduler policy metadata repository based on information collected by the edge application-based information collector and the edge cluster information collector.

Thereafter, depending on the degree of a load of the container platform, one of an edge scheduler policy (ESP) application cost minimization type and an ESP application optimization type may be selected.

Thereafter, containers may be allocated by the edge scheduler policy runner.

Thereafter, through a relative comparison between results before the edge scheduler policy is applied and after the edge scheduler policy is applied, edge scheduler policies for respective types may be evaluated.

Thereafter, the finally selected edge scheduler policy may be applied to the overall scheduling so that a non-applied portion is not present.

Thereafter, the result of application of the finally selected edge scheduler policy may be stored in an edge scheduler policy log data repository through the edge scheduler policy logger.

Thereafter, the edge scheduler policy trainer may collect the stored edge scheduler policy log data, and thus an optimized intelligent edge policy may be generated through the edge scheduler policy trainer.

The multi-cloud edge system according to the present invention, described above with reference to FIGS. 1 to 23, has the following advantages compared to other systems or existing systems.

High-speed container system—it is possible to maintain a high-speed container platform by configuring an in-memory-based container.

Solution of memory constraints—it is possible to solve constraints on memory size by a scalable storage structure and solve problems attributable to volatile memory through a backup/restore function based on a real-time backup environment.

Structure for suitable for sharing—it is possible to share data and images on memory using a unifying-file system provided by the current system.

Kernel-merged simple use—it is possible to easily configure and use the system because each module constituting the system is included in a Linux environment Connection of multiple clusters at L3 layer to network tunneling at user level—it is possible to configure a high-speed network by applying a tunneling technique using a kernel bypass network stack so as to connect a multi-cluster network at high speed.

Provision of an optimized intelligent scheduler function for collaboration
  it is possible to perform scheduling suitable for low-delay service, and apply unified collaboration of vertical collaboration and horizontal collaboration,
  it is possible to apply collaboration at system level,
  it is possible to perform collaboration based on intelligent offloading,
  it is possible to associate a seamless service,
  it is possible to perform integrated distributed processing including cloud/edge/near edge, and
  it is possible to efficiently generate an intelligent scheduler policy based on logs or statistic information.

According to the present invention, there can be provided a high-performance architecture for efficient collaboration between clusters by configuring high-performance containers and a global cache for data association between the containers using a memory-based storage device for improving the efficiency of containers.

Further, the present invention may provide a collaboration service between clusters by connecting tunneling-based high-speed networks.

Furthermore, the present invention may apply and embody an edge platform-based distributed collaboration, which connects horizontal collaboration between a core cloud and an edge to horizontal collaboration between an edge and an edge terminal, at a system level.

As described above, in the multi-cloud edge system according to the present invention, the configurations and schemes in the above-described embodiments are not limitedly applied, and some or all of the above embodiments can be selectively combined and configured such that various modifications are possible.

What is claimed is:

1. A multi-cloud edge system, comprising:
   a core cloud;
   a multi-cluster-based first edge node system; and
   a multi-cluster-based near edge node system,
   wherein the multi-cluster-based first edge node system comprises:
     multiple worker nodes; and
     a master node including a scheduler,
   wherein: the first edge node system receives a request for a computational load corresponding to a task from an external device;
   the master node determines a worker node to which an application capable of performing the task is distributed using the scheduler;
   the determined worker node performs the task; and
   the master node responds to the external device by collecting results of performing the task.

2. The multi-cloud edge system of claim 1, wherein the first edge node system and the near edge node system are connected to each other over a high-speed network based on a tunneling protocol.

3. The multi-cloud edge system of claim 2, further comprising:
   a shared storage device for sharing and storing data depending on a collaborative operation between the first edge node system and the near edge node system.

4. The multi-cloud edge system of claim 1, further comprising:
   a management node for controlling a resource required for a collaborative operation based on data of the first edge node system and the near edge node system.

5. The multi-cloud edge system of claim 1, wherein:
   the first edge node system or the near edge node system comprises computing nodes, and
   each of the computing nodes provides a monolithic application, a micro-service, and a Function as a Service (FaaS) based on a container platform.

6. The multi-cloud edge system of claim 1, wherein a service based on computation in vertical collaboration, provided by the core cloud and the first edge node system, and a service based on computation in horizontal collaboration, provided by the first edge node system and the near edge node system, are provided.

* * * * *